United States Patent
Dale et al.

(10) Patent No.: US 6,272,673 B1
(45) Date of Patent: *Aug. 7, 2001

(54) MECHANISM FOR AUTOMATICALLY ESTABLISHING CONNECTIONS BETWEEN EXECUTABLE COMPONENTS OF A HYPERTEXT-BASED APPLICATION

(75) Inventors: Geoffrey W. Dale, Cupertino; Eric J. Swenson, Santa Cruz; Michael J. Skok, Atherton; Matthew Stave, San Jose; Jeffrey S. Boehm, Los Altos; Sanjay J. Poonen, Cupertino, all of CA (US)

(73) Assignee: AlphaBlox Corporation, Mountain View, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/978,062

(22) Filed: Nov. 25, 1997

(51) Int. Cl.⁷ .................................................. G06F 15/00
(52) U.S. Cl. ................................ 717/1; 717/11; 717/2
(58) Field of Search ................................ 395/701; 717/1, 717/2, 11

(56) References Cited

U.S. PATENT DOCUMENTS

| | | | |
|---|---|---|---|
| 4,860,204 * | 8/1989 | Gendron et al. ........................ | 717/2 |
| 5,027,269 | 6/1991 | Grant et al. . | |
| 5,050,074 | 9/1991 | Marca . | |
| 5,446,902 | 8/1995 | Islam . | |
| 5,457,797 | 10/1995 | Butterworth et al. . | |
| 5,592,626 | 1/1997 | Papadimitriou et al. . | |
| 5,724,506 * | 3/1998 | Cleron et al. ........................ | 395/200.6 |
| 5,781,189 * | 7/1998 | Holleran et al. ........................ | 345/335 |
| 5,784,619 * | 7/1998 | Evans .................................. | 395/682 |
| 5,838,906 * | 11/1998 | Doyle et al. ........................ | 709/202 |
| 5,864,850 * | 1/1999 | Nordman .............................. | 707/10 |
| 5,870,544 * | 2/1999 | Curtis ................................ | 395/187.01 |
| 5,884,056 * | 3/1999 | Steele .................................. | 345/339 |
| 5,889,520 * | 3/1999 | Glaser .................................. | 345/349 |
| 5,892,909 * | 4/1999 | Grasso et al. ........................ | 709/201 |
| 5,911,075 * | 6/1999 | Glaser et al. ........................ | 395/704 |
| 5,966,542 * | 10/1999 | Tock .................................... | 717/11 |

(List continued on next page.)

OTHER PUBLICATIONS

Robert Orfali et al., "Client/Server With Distributed Objects," *Essential Client/Server Survival Guide*, Chapter 21, Part 9, 19 pages, Van Nostrand Reinhold, 1994.

(List continued on next page.)

*Primary Examiner*—Mark R. Powell
*Assistant Examiner*—Chameli C. Das
(74) *Attorney, Agent, or Firm*—Blakely, Sokoloff, Taylor & Zafman LLP

(57) ABSTRACT

A mechanism for automatically establishing connections between executable components of a hypertext-based application is provided. An application created using the mechanism includes a plurality of hypertext-based pages, at least some of which incorporate executable components. The application is invoked by a hypertext request for a page from a browser running on a client tier. An application server responds to the request by retrieving the requested page and assigning any components incorporated therein to the proper tier for execution. The mechanism provides a single model by which any executable component can be specified by an application developer for execution on any tier on the network or made subject to an automatic, dynamic tier assignment by the application server. Components of a given application can be distributed across, and specified for execution on, three or more different tiers and moved from tier to tier. An application developer can use a conventional hypertext editor to integrate selected components into extended hypertext pages to create an application.

46 Claims, 14 Drawing Sheets

U.S. PATENT DOCUMENTS

| | | | | |
|---|---|---|---|---|
| 5,978,579 | * | 11/1999 | Buxton et al. | 717/1 |
| 6,006,231 | * | 12/1999 | Popa | 707/101 |
| 6,020,884 | * | 2/2000 | MacNaughton et al. | 345/329 |
| 6,035,119 | * | 3/2000 | Massena et al. | 717/1 |
| 6,044,218 | * | 3/2000 | Faustini | 717/2 |
| 6,049,664 | * | 4/2000 | Dale et al. | 717/1 |

OTHER PUBLICATIONS

Andy Patrizio, "Lotus Forges Java Links—InfoBus lets Beans, applets Communicate," *Information Week*, May 12, 1997.

*InfoWorld*, "The Web Hotlist; Web sites worth checking out," IDG Communications, Inc., May 26, 1997, p. 75.

Paula Rooney, "InfoBus to Direct JavaBeans Traffic," *PC Week*, Apr. 21, 1997, vol. 14, No. 16, p. 31.

"Importance of JavaBeans highlighted," *Workgroup Computing Report*, Phillips Business Information, Inc., Apr. 15, 1997.

Darryl K. Taft, "Sun Shipping New Java OS," *TechWire*, CMP Media, Inc., Mar. 6, 1997.

"Grid: Source Code," *PC Quest (India)*, Financial Times Asia Intelligence Wire, Mar. 1, 1997.

Steve Steinke, "Novell CEO Brings a Shot of Caffeine," *Network*, Information Access Company, vol. 12, No. 6, p. 18, Jun. 1997.

"Gensym Focuses on Distributed Intelligent Systems," *Telecomworldwide*, Information Access Company, May 29, 1997.

"Visigenic's IDL–to–Java Language Mapping Recommended as New Internet Standard," *Telecomworldwire*, May 29, 1997.

"Middlewave Technology Provides a Missing Link," *Advanced Intelligent Network News*, vol. 7, No. 11, May 28, 1997.

Tony Pompili, "Multiple Personalities," *PC Magazine*, vol. 16, No. 10, p. 117, May 27, 1997.

"Persistence Expands Role in Object Management Group; Persistence Software Now has Full Voting Rights in World's Largest Object Technology Consortium," *PR Newswire*, May 27, 1997.

Sharon Gaudin, "A Darwinian Leap Past the Visual; App developers await time–saving tools," *Computerworld*, software section (Closer Look), p. 47, May 26, 1997.

Natalie Engler, "Code Conspirators," *Computerworld*, Computerworld Intranets section, p. 1, May 26, 1997.

Michael Moeller, "Uniting Crossware Apps; Netscape's component plan ties SuiteSpot to other Platforms," *PC Week*, vol. 14, No. 21, p. 6, May 26, 1997.

"Neuron Data Adds Integration to INTERSOLV PVCS Version Manager; Elements Environment to Gain Advanced Software Configuration Management Capabilities," *PR Newswire*, Financial News Section, May 22, 1997.

"Visigenic: Visigenic's VisiBroker ORB brings IIOP functionality to Cincom's TOTAL FrameWork," *M2 Presswire*, Information Access Company, May 21, 1997.

"AlphaBlox: AlphaBlox announces ActiveBox based on Microsoft's ActiveX," *M2 Presswire*, Information Access Company, Oct. 30, 1996.

Sun Microsystems, Inc. press release dated Dec. 4, 1995, "Netscape & Sun Announce Javascript™ The Open, Cross–Platform Object Scripting Language for Enterprise Networks & the Internet," 10 pages.

"JavaBeans™ The only Component Architecture for Java™," downloaded from http://splash.javasoft.com/beans/glasgow.html on Jun. 16, 1997, 21 pages.

"The Kona InfoBus Technology Brief," downloaded from http://kona.lotus.com/21c2.html on Jun. 16, 1997, 4 pages.

"JavaScript Reference," downloaded from http://developer.netscape.com/library/documentation/communicator/jsref/contents.htm, Oct. 31, 1997, 12 pages.

Paul Dreyfus, "JavaScript on the Server: Internet Application Development Without Native Code," downloaded from http://developer.netscape.com/news/viewsource/javascript.html on Nov. 6, 1997, 9 pages.

Rich Kadel, "Java Servlets in Netscape Enterprise Server," downloaded from http://developer.netscape.com/news/viewsource/kadel_servlet.html on Nov. 6, 1997, 13 pages.

* cited by examiner

US 6,272,673 B1

MECHANISM FOR AUTOMATICALLY ESTABLISHING CONNECTIONS BETWEEN EXECUTABLE COMPONENTS OF A HYPERTEXT-BASED APPLICATION

FIELD OF THE INVENTION

The present invention pertains to the field of network-based software. More particularly, the present invention relates to software applications that are designed for use on the Internet.

BACKGROUND OF THE INVENTION

The rapid growth in the use of the Internet and the World Wide Web ("the Web") has sparked a dramatic increase in the development of Internet-based software applications. Developments in Internet software have arisen in many different areas ranging from on-line shopping and banking to games and entertainment. Web-based tools such as Java, JavaBeans, and ActiveX have helped to partially bridge the gap between the simple, text-only Web pages of the early Internet and sophisticated software applications. In particular, these tools allow Web designers to include small, special-purpose programs (sometimes referred to as "applets", "Beans", or more generally, "components") within Web pages written in a hypertext language, such as the Hypertext Mark-up Language (HTML). Thus, Web pages have been transformed from passive, text-only displayable documents to dynamic documents that can provide moving graphics, video, sounds, and interactive capability.

While progress is being made in the development of Internet applications, application development tools for the Internet still have a number of shortcomings. For example, conventional Web-oriented programming models such as Java, JavaBeans, and ActiveX are not "tier-neutral" with respect to the environments in which they run. That is, the services upon which such models rely tend to be very specific to the tier (e.g., client or server), operating system, and in some cases, hardware. For example, while Java and JavaBeans do not have operating system and hardware dependencies as ActiveX controls do, they must exist in an environment or infrastructure that provides the necessary services (e.g., communications, access to environment, parameterization, connectivity to external services, etc.) to operate.

The surrounding environment or infrastructure in prior art application development systems tend to be tier-specific. The tools, mechanisms, and services available on client tiers, for example, are quite different from those available on server tiers. In heterogeneous hardware environments, the server tiers may also provide significantly different environments. Further, these systems do not allow components of an application to be moved from one tier to another, or to be distributed among multiple tiers. Such capability may be desirable for purposes of performance, security, or browser capability.

In addition, with conventional tools, interfaces between applets or other executable components must be custom-coded into the hypertext document. In particular, an application developer specifically "wires" (i.e., writes code for) the connections between components, so that the components can communicate with each other. This constraint makes it difficult for inexperienced programmers to create Web applications and causes application development to be a laborious, time-consuming process.

A common approach to creating application development tools for the Web has been to retrofit existing tools with Web "front ends" (user interfaces). As a result, such tools are not ideally-suited to the development of Web applications. Further, retrofitted tools are not likely to adapt well to future changes in the platforms, users, and types of usage of the Internet.

Hence, it would be desirable to have Internet applications and application development mechanisms which overcome the above-mentioned disadvantages. In particular, what is needed is an application development mechanism that is specifically designed for development of Internet applications, especially Web-based applications. What is further needed is a single development mechanism that is based on a single, tier-neutral model, using which application developers can create application components for execution on any tier on a network, distribute application components across multiple tiers on a network, or move application components from tier to tier. In addition, what is needed is an application development mechanism which allows Internet applications to be created faster and more easily by people who have little or no programming experience.

SUMMARY OF THE INVENTION

The present invention includes a mechanism for enabling a user to create a software application. The mechanism comprises means for enabling the user to include a number of executable components in the software application without specifying connections between any of the components, and at least two of the plurality of components require such a connection for purposes of executing the software application. The mechanism also comprises means for enabling the required connections to be established automatically during execution of the software application. Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
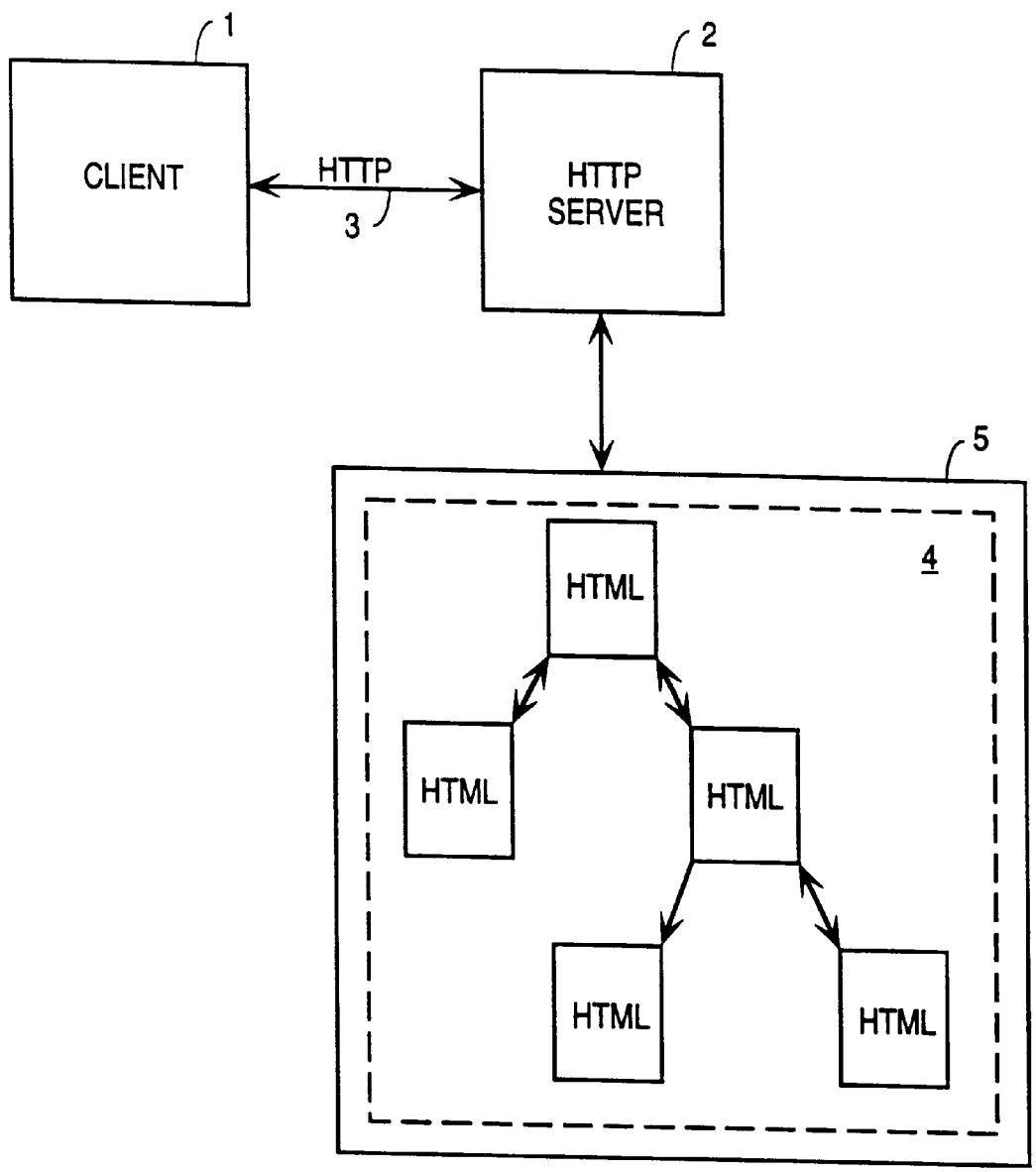
FIG. 1 illustrates a network arrangement by which a Web server provides a client computer with access to HTML pages.

A mechanism for automatically establishing connections between executable components of a hypertext-based application is described. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to facilitate description of the present invention.

The present invention includes a "tier-neutral" mechanism for application assembly, using which developers with little or no programming experience can easily create Web based applications. In other words, using a single application development mechanism in accordance with the present invention, Web developers can create applications to run on any tier on a network or to run across multiple tiers. In this description, the term "tier" is used to distinguish between a client and a server on a network and to distinguish between multiple servers.

The present invention may be carried out in one or more computer systems, each in response to its central processing unit (CPU) executing sequences of instructions contained in memory. That is, execution of the sequences of instructions contained in memory causes the computer's CPU to perform steps to execute part or all of a Web-based application. As will be apparent from the description which follows, the instructions may be loaded into the computer's memory from a persistent store, such as a mass storage device, and/or from one or more of the other computer systems (collectively referred to as the "host computer system") over the Internet. For example, the host computer system may transmit a sequence of instructions to the receiving ("target") computer system in response to a message transmitted to the host computer system over a network by the target computer system. As the target computer system receives the instructions via a network connection, such as a conventional telephone modem, Ethernet adapter, Integrated Services Digital Network (ISDN) adapter, or the like, the target computer system stores the instructions in memory. The target computer system may store the instructions for later execution or execute the instructions as they arrive over the network connection. The host computer system may also execute various aspects of the Web-based application.

In some cases, instructions which embody the present invention may be directly supported by the CPU of the executing computer. Consequently, execution of the instructions may be performed directly by that computer's CPU. In other cases, the instructions may not be directly executable by the computer's CPU; under these circumstances, the instructions may be executed by causing the CPU to execute an interpreter that interprets the instructions, or by causing the CPU to execute instructions which convert the received instructions to instructions which can be directly executed by the CPU.

In alternative embodiments, hardwired circuitry may be used in place of, or in combination with, software instructions to implement the present invention. Thus, the present invention is not limited to any specific combination of hardware circuitry and software, nor to any particular source for the instructions executed by a computer system.

FIG. 1 illustrates an arrangement of processing systems by which a user can browse the World Wide Web ("the Web"). A client computer system 1 has a connection 3 via the Internet to a server computer system 2. The client system 1 executes browser software which, in response to a user command, sends a request for a Hypertext Mark-up Language (HTML) page to the server 2 using Hypertext Transport Protocol (HTTP). The requested HTML page is one of a number of HTML pages 4 that are stored in a storage facility 5. The storage facility 5 may or may not be physically located on the same computer system as the server 2. The HTML pages 4 are functionally interconnected by various hypertext links and may be logically arranged in a tree hierarchy, as shown. In response to the browser's request, the server 2 retrieves the requested page and provides it to the client 1, which then displays the page to the user.

Figure 2:
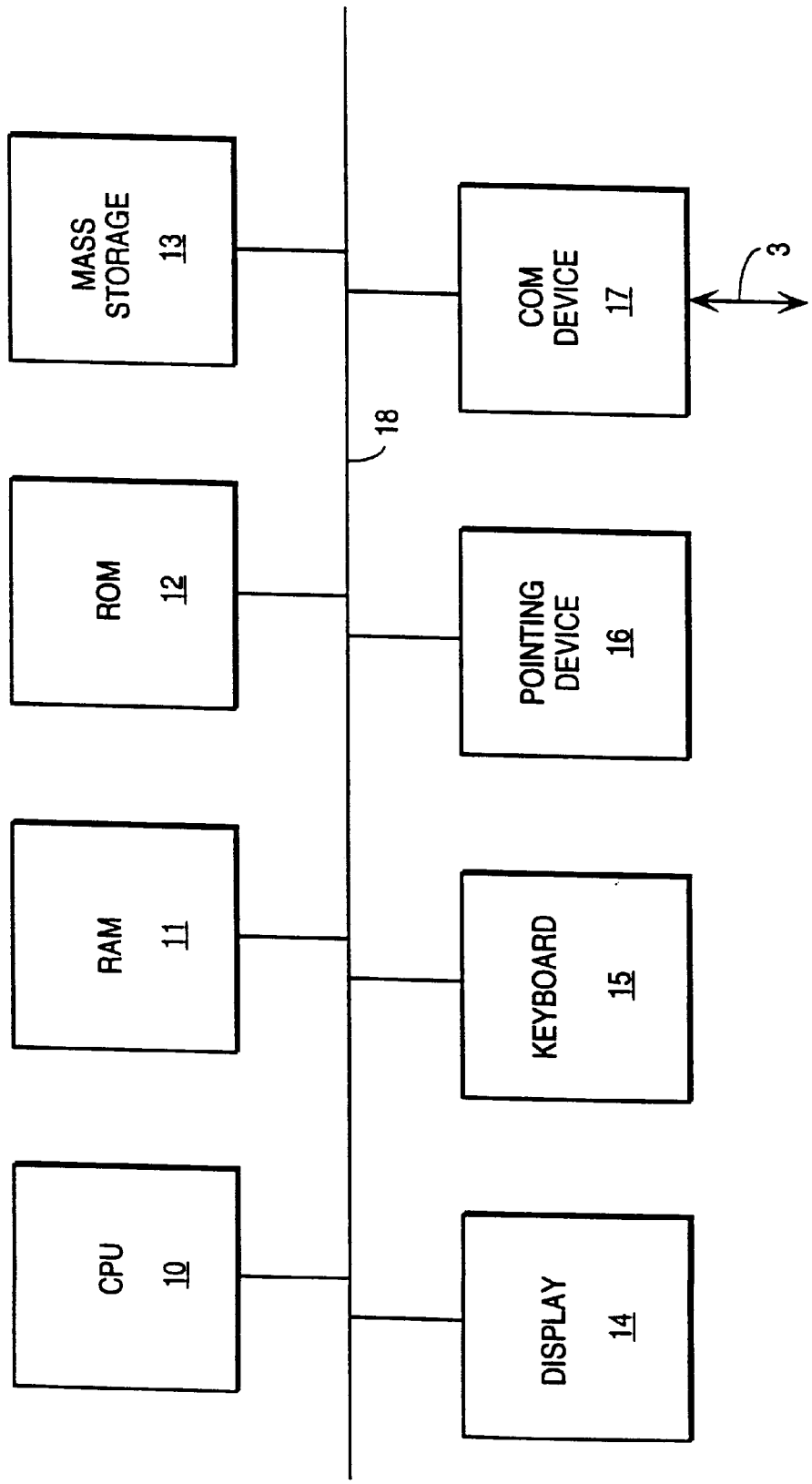
FIG. 2 illustrates a computer system.

FIG. 2 is a simplified block diagram of the architecture of a computer system, such as a conventional personal computer (PC). Client system 1, server system 2, and any other computer system mentioned in this description may have the architecture of FIG. 2 or a similar architecture, except as stated otherwise. Numerous variations upon the overall configuration illustrated in FIG. 2 are possible, however, within the scope of the present invention. The computer system of FIG. 2 includes a CPU 10, random access memory (RAM) 11, read-only memory (ROM) 12, and a mass storage device 13, all coupled to a bus 18. The bus 18 may actually include one or more physical buses interconnected by one or more adapters, bridges and/or controllers. Also connected to the bus 18 are a display device 14, a keyboard 15, a pointing device 16, and a communication device 17. The communication device 17 provides an interface between the illustrated computer system and the network connection 3 for purposes of communicating with other computer systems.

The communication device 17 may be any suitable device for providing digital communication over the network connection 3, such as a conventional Ethernet or other local area network (LAN) adapter, telephone modem, ISDN adapter, Digital Subscriber Line (xDSL) adapter, cable television modem, or any other suitable device. The mass storage device 13 may include any suitable non-volatile medium for storing large amounts of data, such as a magnetic disk, a magneto-optical (MO) disk, a CD-ROM, CAR, CD-RW, or the like. The pointing device 16 may be any suitable device for allowing a user to position a pointer displayed on the display device 14, such as a mouse, trackball, touchpad, or the like. Numerous variations upon the aforementioned components are possible within the scope of the present invention.

The present invention includes a "tier-neutral" model by which Web developers can easily create Web based applications. In other words, using a single application assembly mechanism of the present invention, Web developers can create applications for any tier and, if desired, distribute applications across multiple tiers. Further, the tool allows applications to be created quickly and easily by someone with little or no programming experience.

Using the above-mentioned development mechanism, Web based applications are created from conventional HTML pages in combination with certain executable "components" and a program infrastructure, as will be described below. The specific functions of the executable components depend upon the nature of the application but may include, for example, charting or spreadsheet functions, spell checking, and various user interface functions. The components can be written in Java programming language and implemented as Java classes. In such embodiments, the components can be incorporated into HTML pages using applet tags. Thus, an application designed according to the present invention includes one or more conventional HTML pages with one or more of these components. The components are dynamically downloaded as needed when the user browses to a corresponding HTML page, and the entire application is maintained on the server side.

Figure 3:
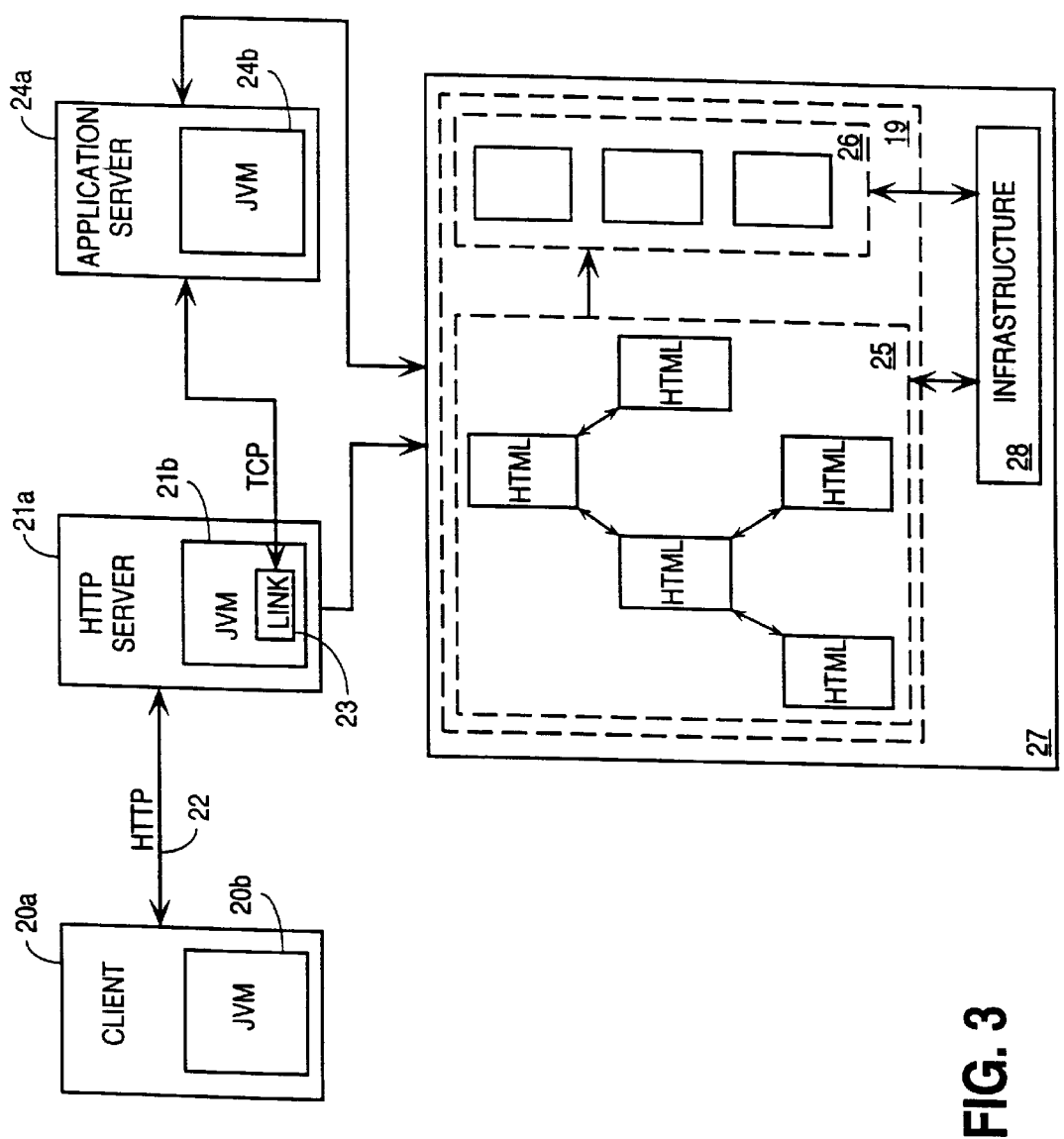
FIG. 3 illustrates a network arrangement by which a server computer provides a client computer with access to a Web-based application in accordance with the present invention.

FIG. 3 illustrates one arrangement by which the user of a client computer system 20a can access and execute a Web-based application 19 created in accordance with the present invention. In the description which follows, the present invention is described using the example of an application which resides and executes on a wide area network (WAN), i.e., the Internet. Note, however, that the present invention can also be used to assemble applications which reside and execute on a LAN, such as in an Intranet environment. Referring then to FIG. 3, the client computer system 20a executes browser software and preferably includes a Java Virtual Machine (VM) 20b. The client 20a executes browser software and communicates over the Internet with a conventional Web server (hereinafter the "HTTP server") 21a via a network connection 22 using HTTP protocol. Network connection 22 may be a conventional telephone link, ISDN link, xDSL link, cable television link, Ethernet link, or any other suitable communication link. The HTTP server 21a may include its own JVM 21b, as shown, although that is not necessary for purposes of the present invention. The HTMP server 21a may comprise any conventional Web server software, such as Netscape Enterprise Server, Microsoft Internet Information Server, or Apache.

In accordance with the present invention, the network arrangement also includes a second server 24a, which shall be referred to as the "application server" 24a. As will be described below, the application server 24a performs certain functions associated with the present invention, such as assigning executable application components to appropriate tiers. The HTWP server 21a and the application server 24a may or may not be physically located on the same computer system. The "application server" includes a JVM 24b. The JVM 21b of the HTTP server 21a includes a link component 23, which provides a communication interface between the HTRP server 21a and the application server 24a using Transport Control Protocol (TCP). The link provides a mechanism by which the HTTP server 21a can delegate HTTP requests to the application server 24a. If the HTTP server 21a does not include its own JVM 21b, this link mechanism can be provided using, for example, CGI (Common Gateway Interface), NSAPI (Netscape Server Application Program Interface), or Microsoft ISAPI (Internet Server API).

The HTIP server 21a and the application server 24a each have access to the contents of a storage facility 27. The storage facility 27 may or may not be physically located on the same computer system as the HTTP server 21a and/or the application server 24a. In fact, the storage facility 27 may be located essentially anywhere on the Internet and may be distributed across multiple computer systems. Further, the storage facility may be embodied as separate data repositories for the HTTP server 21a and the application server 24a, or one storage facility may be a subset of the other. Thus, the storage facility 27 is described herein as a single logical and physical entity only for purposes of simplicity. The storage facility 27 may be embodied as one or more conventional storage devices.

The storage facility 27 stores a number of HTML pages 25 and a number of executable components 26 of the present invention. The HTML pages 25 in combination with the components 26 form a Web-based application 19 in accordance with the present invention. The HTML pages 25 may be logically arranged in a tree hierarchy, as shown. Generally, the application 19 is invoked in response to a request from the client 20a for an HTML page that includes one or more references ("tags") to one or more of the components 26. Execution of the application 19 is supported by a programming infrastructure 28, the purpose and functions of which are described below.

The components 26 of the present invention are based on the conventional concept of "applets", i.e., small portions of executable code that can be incorporated (by reference) into HTML pages. The components 26 may be embodied as Java classes, as is assumed to be the case for purposes of this description. However, it will be recognized that the components 26 may alternatively be implemented in another object-oriented language. Thus, the present invention is not limited to a Java implementation. Each of the components 26 is incorporated into one or more of the HTML pages 25 by placing an applet tag corresponding to the component within the appropriate HTML page or pages.

The application components 26 have several distinguishing characteristics, however, which make them conducive to rapid and easy application assembly. In particular, the components have relatively large granularity as well as fully exposed controls, which allow the components to be used by all levels of users from casual page designers to application developers. The components differ by an order of magnitude in granularity from traditional applets. Because the components tend to be inherently larger than traditional applets, they may encompass an entire business process or function. For example, a single component can be a charting component or a spreadsheet component.

The components 26 can execute on any tier on the network, e.g., only on the application server 24a, only on the client 20a, or on any available tier (e.g., one of several available servers). User interfaces of the components 26 are completely decoupled and can be rendered on different platforms using different languages. Further, the components 26 have features which allow connections between them to be automatically established at run time without any scripting or custom coding. All components have fully exposed properties (e.g., applet parameters), methods, and events that can be controlled through script, for example. Alternatively, properties can be set at design time using a development tool or text editor and become the initial state of a component. If the application developer is using any conventional page design tool, such as Netscape Visual JavaScript, Microsoft FrontPage, or Net Objects Fusion, the property style sheets can be presented in simple dialog boxes, and the exposed properties, methods, and events can be scripted through point-and-click dialogs.

As noted above, the components 26 can execute on any tier. More specifically, the system of the present invention allows the application developer to make an explicit choice of tier assignment for any component, if desired. Accordingly, each component can be explicitly specified to execute on the client tier, on the server tier, or on a specific one of multiple server tiers. Alternatively, the application server 24a can automatically decide on which tier a component is to execute, such as when no tier specification is made for the component. This automatic tier assignment may be made based on, for example, available resources, load balancing criteria, hints, performance criteria, or other criteria. In that case, the application developer need not be concerned with the tier or tiers on which a component should execute. The ability to make an automatic, dynamic tier assignment, therefore, provides an advantage over other application development systems, in which the developer must explicitly choose a tier.

Server-side components (i.e., components which execute on a server tier) can be specified to execute so that their output is rendered as HTML back into the referencing HTML page in place of the applet tag before the referencing page is provided to the client 20a. In that case, the client 20a receives only a conventional HTML page with no applet tags.

Another important feature of the present invention is that, in contrast with conventional Web-based development tools, functional connections between components of a Web application can be established to allow components to communicate with each other, without the need for custom coding by the application developer to specifically "wire" (specify) the connections. Thus, the tier-neutral model of the present invention allows the creation of components which effectively "snap together" automatically when the application is executed. This characteristic is in contrast with conventional programming models which require custom coding within hypertext pages to create connections between applets.

Figure 4A:
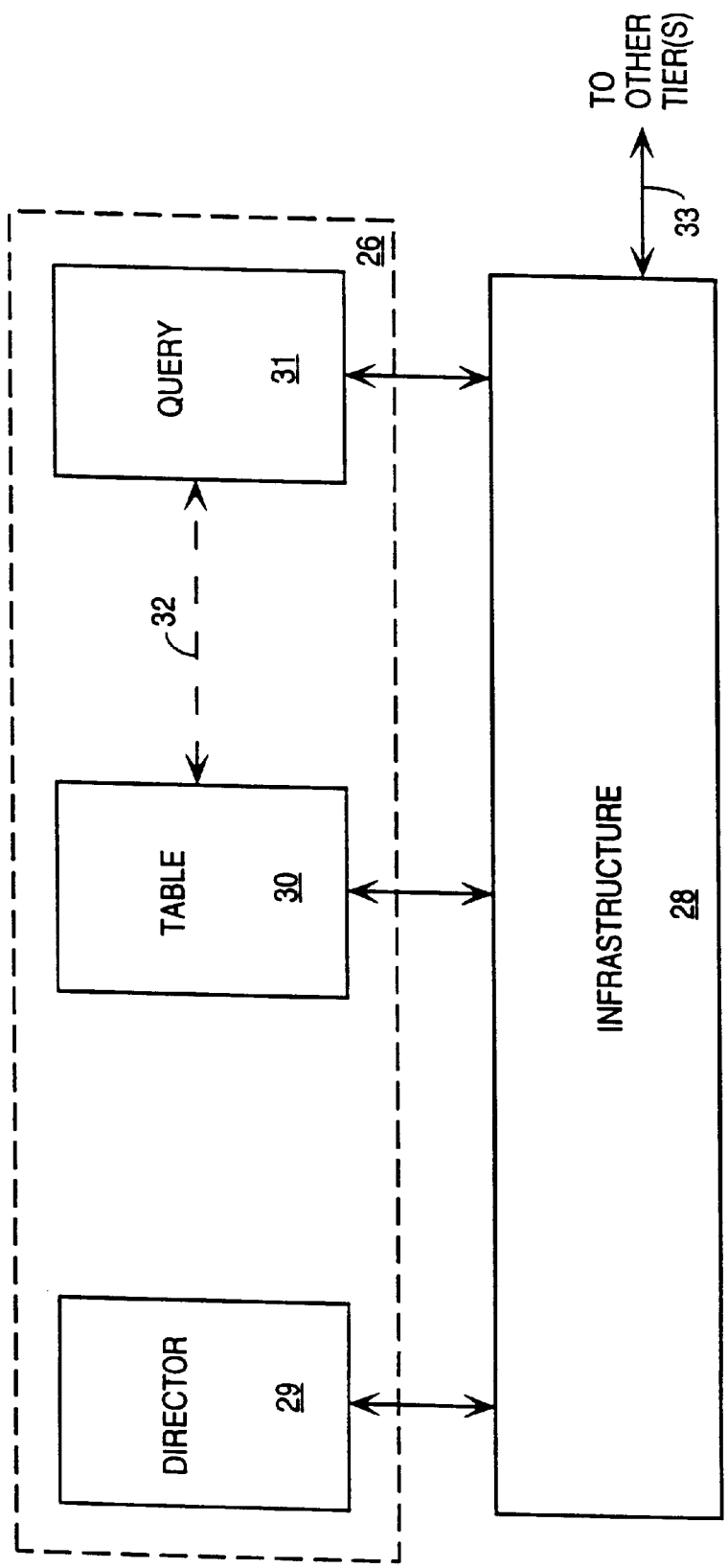
FIG. 4A illustrates software application components in communication with an infrastructure.

A simple example of how the application 19 executes is described now with reference to FIG. 4A. For purposes of description, assume that the components 26 have been assigned to execute on the client tier 20a, unless stated otherwise. However, note that many of the functions described below can also be performed in like manner by the application server 24a. In the example of FIG. 4A, the application 19 allows a user of the client 20a to perform a query upon a database (not shown). The result set of the query is to be provided by a table. Consequently, the components 26 include a query component 31 for receiving user input specifying the query and a table component 30 for actually querying the database and for providing a result set in response to the query. Note that the table component 30 may also provide the result set to some form of output component (not shown) for displaying a chart or some other form of report to the user.

At this point, it should be noted that in this description, certain components, methods, and routines are described as "performing", "for performing", or "responsible for" a particular fumction, or other similar language. It will be recognized, however, that it is the execution of these components, methods, and routines by a processor (i.e., a CPU) which actually causes the function to occur.

To perform the query upon the database, a functional connection 32 is required between the query component 31 and the table component 30. With conventional programming models, such a connection would be established by custom coding the query component 31 and/or the table component 30, or by custom coding an event handler in script or a language which bridges the two components. However, the present invention enables this connection to be automatically created at run time, so as to eliminate the need for such custom coding. This feature, which is described below, enables Web designers with little or no programming experience to easily construct Webbased applications.

In accordance with the present invention, the components 26 also include a special-purpose component 29 referred to as the "director" component, as shown in FIG. 4A. The director component 29 provides various control functions associated with the application, which are performed in conjunction with the infrastructure 28. These functions include maintaining registrations for the other components 26 and maintaining certain global default parameters of the application 19. The director component 29, the table component 30, and the query component 31 each have a connection to the infrastructure 28.

Figure 4B:
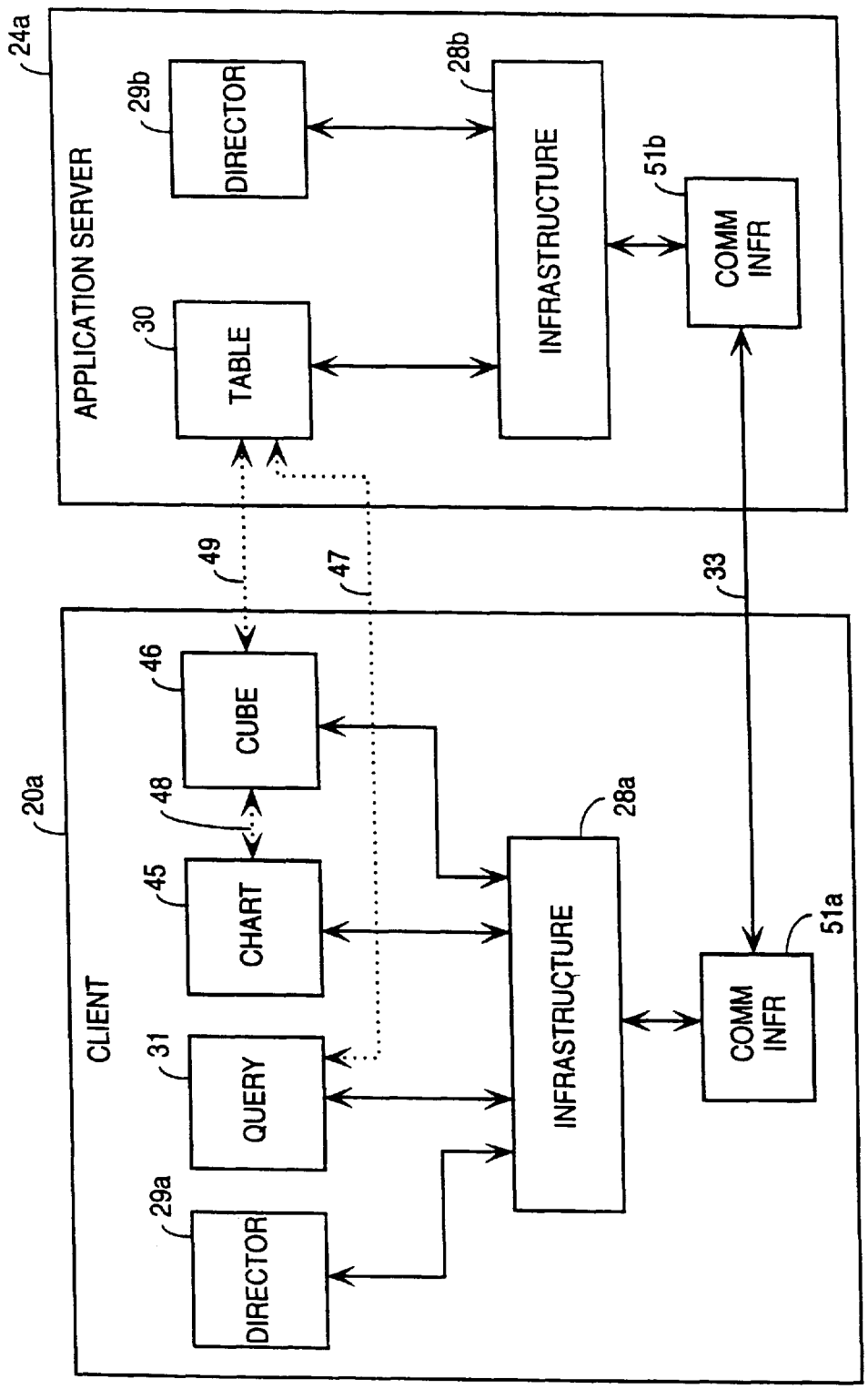
FIG. 4B illustrates a software application distributed across multiple tiers.

FIG. 4B illustrates how a software application created according to the present invention may be distributed across multiple tiers (two in this case). As shown, the infrastructure on one tier may have a connection to a corresponding infrastructure on at least one other tier. Connections 47 and 49 between application components and connection 33 are established across tiers. A director component and an infrastructure are instantiated on each tier on which a component is to execute, and more specifically, for each different session on each tier on which a component is to execute. Thus, if an application includes both client-side components and server-side components, then separate director components and infrastructure are instantiated on the client and on the server and, more specifically, on any client or server machine on which a component is to execute. In the case of a multi-tiered application, the director component 29 is connected to a corresponding director component on at least one other tier via the infrastructures.

Referring still to FIG. 4B, the application 19 is distributed between the client 20a and the application server 24a. An infrastructure 28a is instantiated on the client 20a, while an essentially identical infrastructure 28b is instantiated on the server 24a. In this example, the components 26 of application 19 include a query component 31, a chart component 45, and a cube component 46, each instantiated on the client 20a and connected to the infrastructure 28a. The components 26 further include a director component 29b and a table component 30, both instantiated on the server 24a and connected to the infrastructure 28b. The query component 31 is for enabling a user to input a query upon a database (not shown). The table component 30 is for communicating with the database and for maintaining a result set based on the query. The cube component 46 is for transforming two-dimensional data from the database into a multi-dimensional representation which supports examining slices or cross-sections of the data. The chart component 45 is for displaying the results to a user. The client 20a and server 24a further maintain communications infrastructures 51a and 51b, respectively, which manage communications over connection 33. Communications infrastructure 51a has a connection to the client's main infrastructure 28a, while communications infrastructure 51b has a connection to the server's main infrastructure 28b and (via link 33) to communications infrastructure 51a.

In this example, connection 47 is automatically established between the query component 31 and the table component 30 at run time, to allow the query component 31 to specify to the table component 30 data that is to be retrieved from the database. Connection 48 is automatically established between the chart 45 and the cube 46 at run time, to allow the chart component 45 to receive data from the cube component 46. Further, connection 49 is automatically established between the table component 30 and the cube component 46 at run time, to allow data to be transferred from the table 30 to the cube 46.

Figure 5:
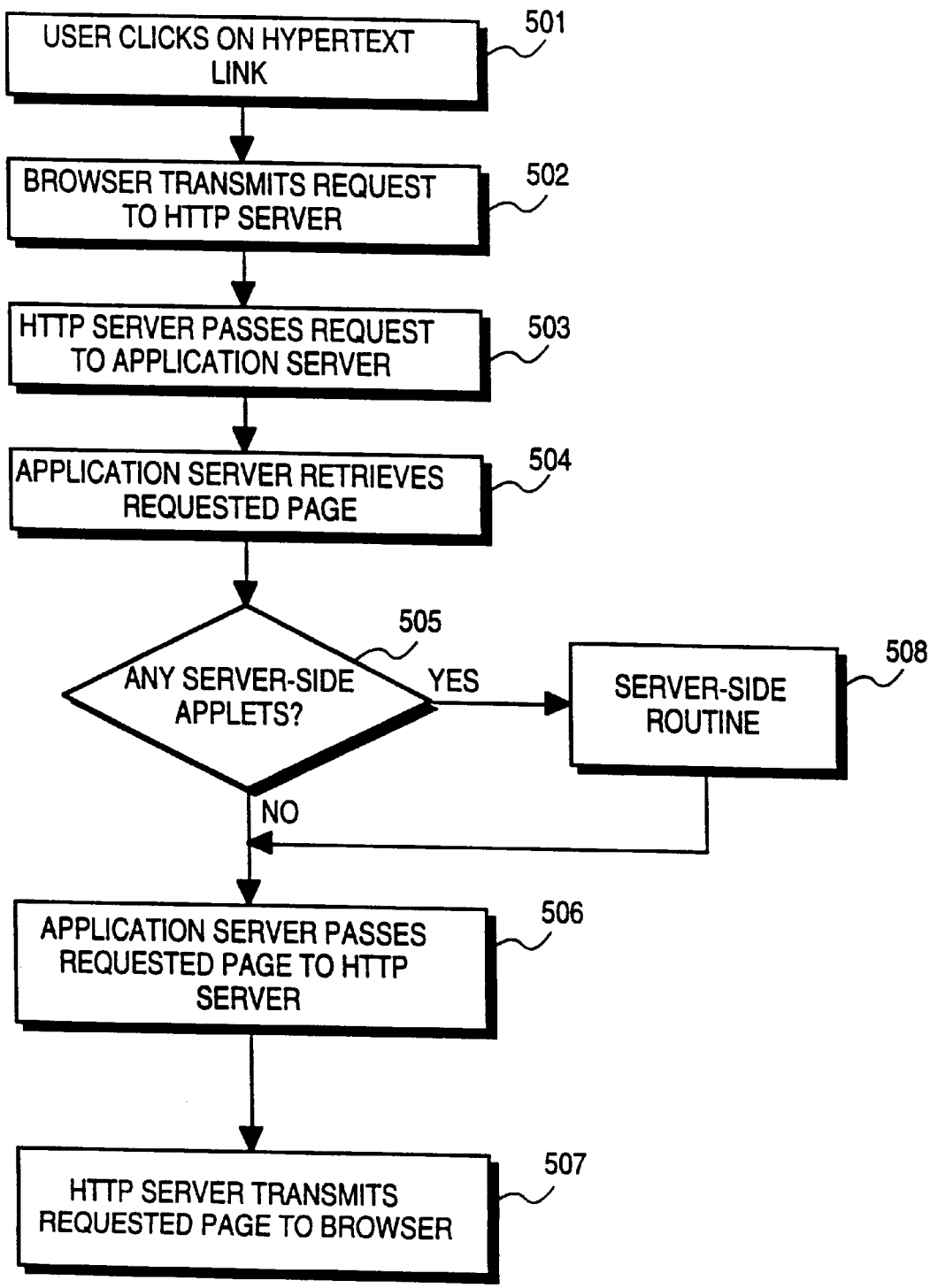
FIG. 5 is a flow diagram illustrating a routine by which a software application is invoked.

The process for invoking an application will now be described at a high level with reference to FIG. 5. In step 501, the user of client 20a (FIG. 3) clicks on a hypertext link to one of the HTML pages 25. The client 20a then transmits a request for the corresponding page to the HTTP server 21a in step 502. In step 503, the HTTP server 21a passes the request on to the application server 24a, and in step 504, the application server 24a retrieves the requested page from the storage facility 27.

Each of the components 26 is referenced by an applet tag in at least one of the HTML pages 25. Each applet tag may include information that is not found in conventional applet tags, such as a designation of which tier the applet is to be executed on and/or the scope (duration) of a component's instantiation. Therefore, in step 505, the application server 24a determines whether the requested page refers to any server-side components (i.e., components to be executed on any tier other than the client tier) based on the contents of the corresponding applet tags and any rules or heuristics established by the system administrator. If no server-side components are identified in the requested page in step 505, then in step 506 the application server 24a passes the requested page to the HTTP server 21a, which passes the page to the client 20a in step 507. If the application server identifies one or more server-side components referenced by the requested page in step 505, then the application server 24a performs the server-side routine of step 508, which is described below. Following the server-side routine, the routine of FIG. 5 proceeds from step 506.

As noted above, each applet tag may include information which is not found in conventional applet tags, such as a designation of which tier the component is to be executed on and/or the scope (duration) of a component's instantiation. This information is provided in the form of applet attributes designated "tier" and "scope", respectively. Possible values for "tier" include, for example, "client", which is the default in one embodiment, "server", or other values to specify more complicated designations, as set up by the system administrator. In addition, a component can be specified for a particular client tier or a particular server tier by defining additional values for "tier", or a component can support a dynamic choice of tier by the application server 24a, as noted above. The ability to explicitly assign a component to a given tier allows the application designer to determine where to put the application logic and how to distribute the processing load. By using the tier attribute, the difference between running on the client or the server becomes a simple property that can be easily toggled for testing purposes or conditionally set to run on a client or server based on user profile, browser specifications, or other runtime properties, such as server load, performance, etc.

The "scope" attribute represents the duration of a component's instantiation on its specified tier and can have the values "request", "application", "session", or "global". "Request" scope, which is the default in one embodiment, indicates that the corresponding component will be instantiated as an object only while the corresponding HTML page is rendered. "Application" scope indicates that the corresponding component will be instantiated and available to other tiers provided they are executing the same application. "Session" scope indicates that the component will be instantiated and available only throughout a particular browser session, and "global" scope indicates that the applet is to remain instantiated until it is explicitly destroyed and is accessible to all clients and applications.

An example of an applet tag including the "tier" and "scope" parameters is as follows:

<applet code=sample tier=server scope=session name=sample_component></applet>

In the above example, the component known as "sample_component" is specified to execute on a server tier and to have "session" scope.

Generally, when a page is requested, a number of objects are instantiated (created) for each component referenced by the page. Instantiation of a component is performed by the tier to which the component has been assigned. Thus, in the example of FIG. 4, the client 20a instantiates the table component 30 and the query component 31 when the page referencing these components is downloaded. Also, downloading the first HTML page that references one of the components 26 to the client also results in the creation of the director component 29.

Figure 6:
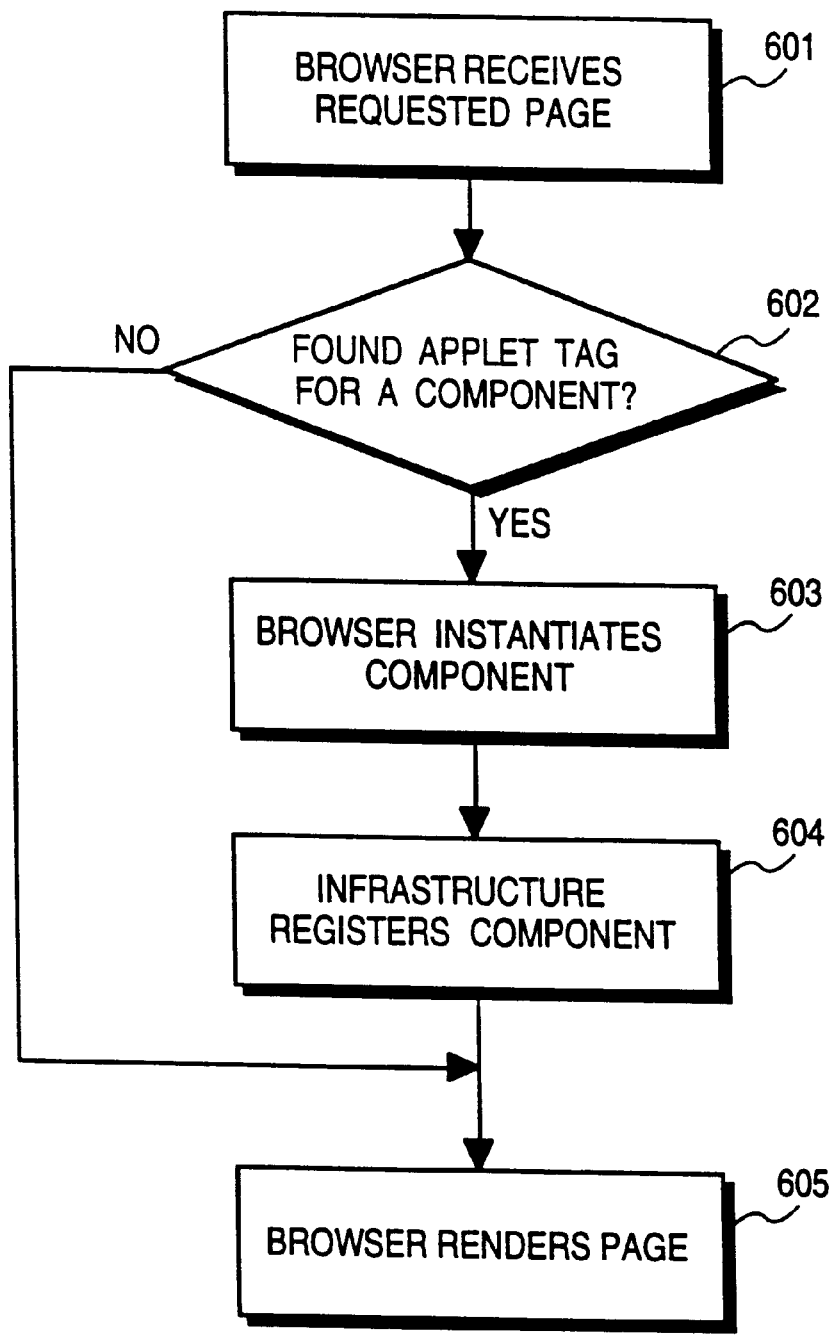
FIG. 6 is a flow diagram illustrating a routine by which a component is instantiated and registered.

Upon instantiation of a component, the component registers its existence, as will now be explained with reference to FIG. 6. FIG. 6 illustrates a routine by which a component is instantiated and registered. In step 601, the client 20a receives a requested HTML page. In step 602, if the client 20a detects an applet tag for a component, the browser instantiates the component in step 603. In step 604, the infrastructure 28 registers that component's existence, and the browser renders the page in step 605. If no applet tag was found for a component in step 602, then the client 20a simply renders the page normally in step 605. When the first HTML page containing an applet tag for one of the components 26 is downloaded to the client 20a, the director component 29 and each other component referenced by that page (e.g., table component 30 or query component 31) are instantiated on the client computer system 1.

Figure 7:
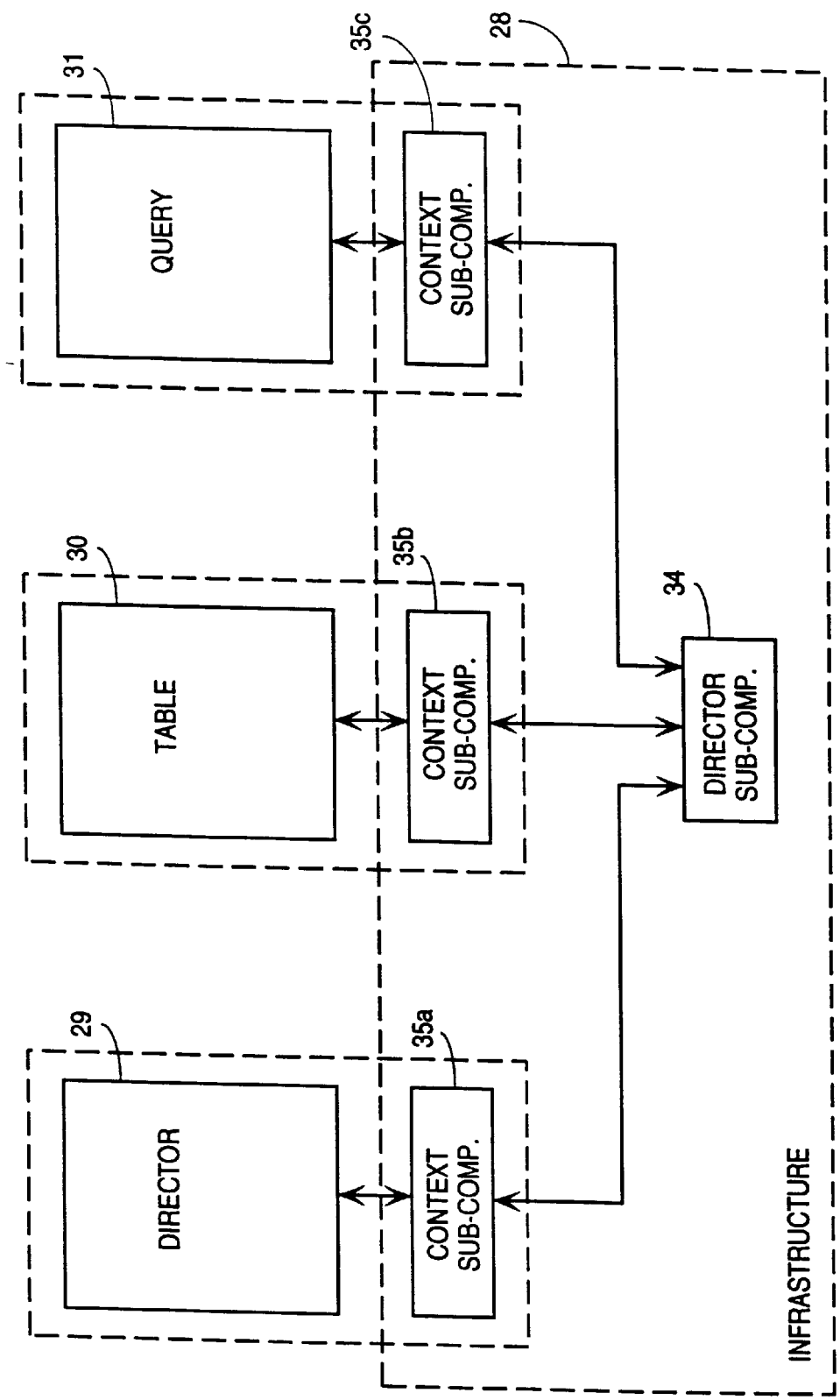
FIG. 7 illustrates in greater detail the components illustrated in FIG. 4.

Referring now to FIG. 7, the components 26 and infrastructure 28 will now be described in greater detail. The infrastructure 28 includes an object referred to as the director sub-component 34. The director component 29 generally provides the front end to director sub-component 34, in addition to the functions mentioned above. The director sub-component 34 is responsible for managing the core functions of the application 19, including maintaining registrations of the other components (e.g., table component 30, query component 31, etc.) associated with the application 19 and handling requests from various components for connections to other components. In particular, (execution of) the director sub-component 34 maintains a list of registrations of all components of the application 19, which includes a reference to each component, and the use of which is described below. These functions of the director sub-component 34 enable the components to automatically acquire connections to each other without the need for the application developer to explicitly "wire" (i.e., write code to specify) the connections.

Note that in one embodiment, an application of the present invention will create one director component and one director sub-component for each distinct scope level used by the application. For example, if certain components default to the "request" scope while others are specified as "application" scope for a given tier, then at least two director components and at least two director sub-components would be created on that tier, i.e., one for "request" scope and one for "application" scope.

In addition to instantiating components 29, 30, and 31, the client 20a also instantiates several additional objects. (If one or more components are server-side components, however, then these additional objects may be created by the application server 24a.) The additional objects include, for each component, an object referred to as a context sub-component. Each context sub-component is associated with a particular one of the components 26, although the context sub-components are actually part of the infrastructure 28.

Each context sub-component may be implemented as a Java class and includes methods for setting parameters and properties, locating other components, and registering its corresponding component. Hence, the client 20a (or application server 24a) creates a context sub-component 35a for the director component 29, a context sub-component 35b for the table component 30, and a context sub-component 35c for the query component 31. Each context sub-component has a reference to its corresponding component and a reference to the director sub-component 34. Note that, although the illustrated embodiment includes a separate context sub-component for each component, the context sub-components can be implemented as a single object which has a reference to all components.

Figure 8A:
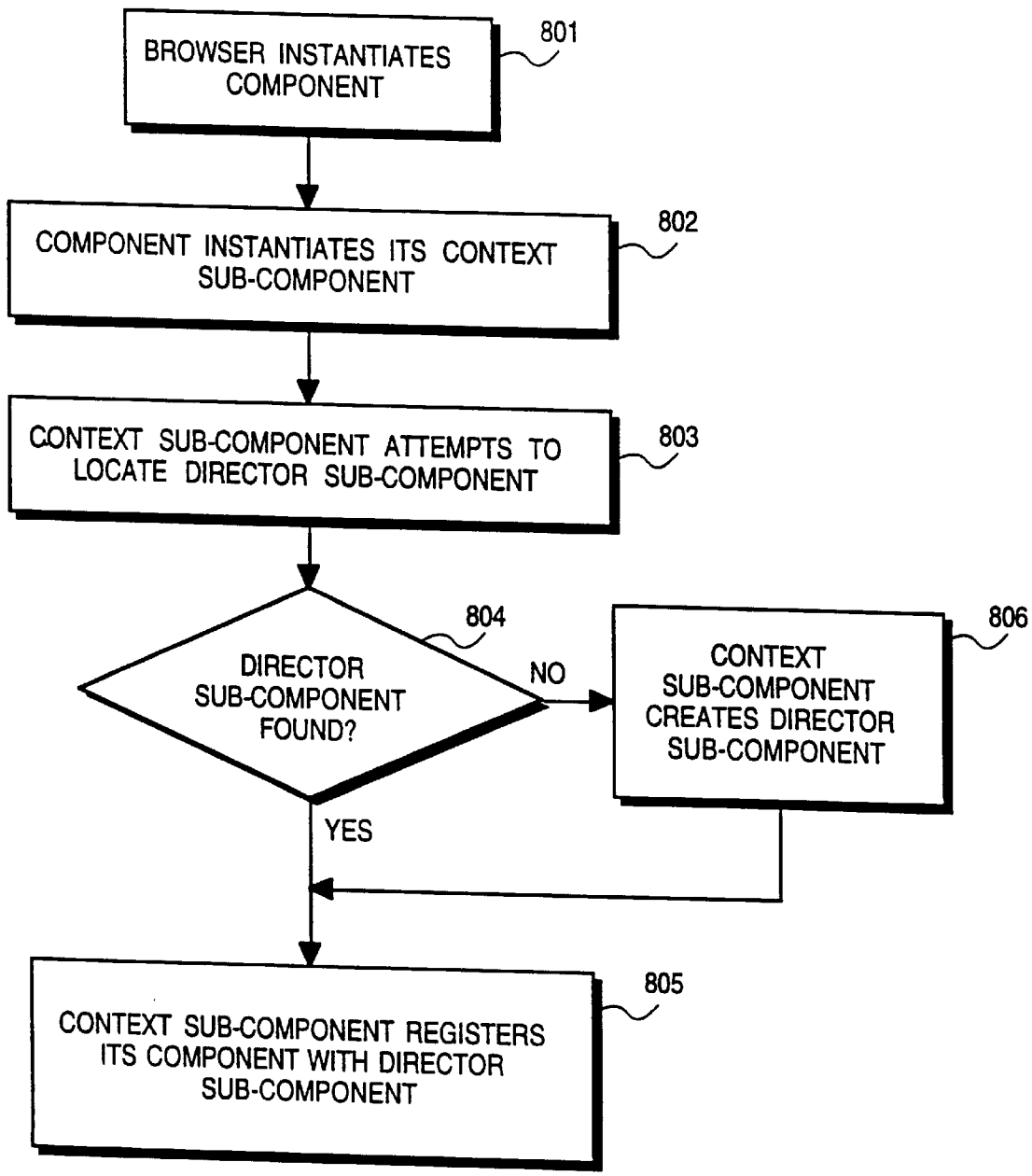
FIG. 8A is a flow diagram illustrating in greater detail certain steps of the routine of FIG. 6.

FIG. 8A illustrates a routine that is performed as a result of executing the objects shown in FIG. 7. In step 801, the client 20a (or application server 24a in the case of the server-side routine-see below) finds an applet tag for one of the components 26 upon receipt of the HTML page and instantiates that component. Next, in step 802 the newly created component creates its context sub-component. For example, if the browser initially finds the tag for the table component 30 in step 801, then in step 802 the newly created table component 30 creates its context sub-component 35b.

Since the tag for the director component 29 may not be the first tag identified by the client 20a, the director component 29 may not be the first component to be instantiated. Consequently, the first component 26 to be instantiated during execution of the application 19 will then instantiate the director sub-component 34 (using its context sub-component). Thus, in step 803, the newly instantiated context sub-component attempts to locate the director sub-component 34. If the component is the first component to be instantiated, then its context sub-component will not be successful in locating the director sub-component 34 (step 804). In that case, the context sub-component first creates the director sub-component 34 in step 806 and then registers its newly instantiated component with the director sub-component 29b in step 805. If the director sub-component was found in step 804 (i.e., the component is not the first component to be instantiated), then the context sub-component registers its component with the director sub-component 34 in step 805. The above routine of FIG. 8A is repeated for each component referenced in the downloaded HTML page.

As noted above, certain components may be specified as server-side components using the "tier" attribute of the applet tag. When that is the case, the application server 24a performs the server-side routine of step 508 (FIG. 5). The server-side routine of step 508 involves a process substantially similar to that of FIG. 8A, discussed above. That is, any server-side components and their supporting infrastructure (i.e., director sub-component and context sub-component) are instantiated on the appropriate server tier, which may be the application server 24a or any other server in the network. In addition, the application server 24a strips out the corresponding applet tag from the HTML page before allowing the page to be returned to the client 20a. As a result, the client 20a sees only a standard HTML page. If the output of a server-side component is HTML code, then that code can be rendered back into the calling page by the application server 24a before the page is provided to the client 20a. Note that when a component is instantiated on a server tier and must persist for longer durations than handling the current request, its scope will generally be altered from the default "request" scope to a scope of longer duration.

Figure 8B:
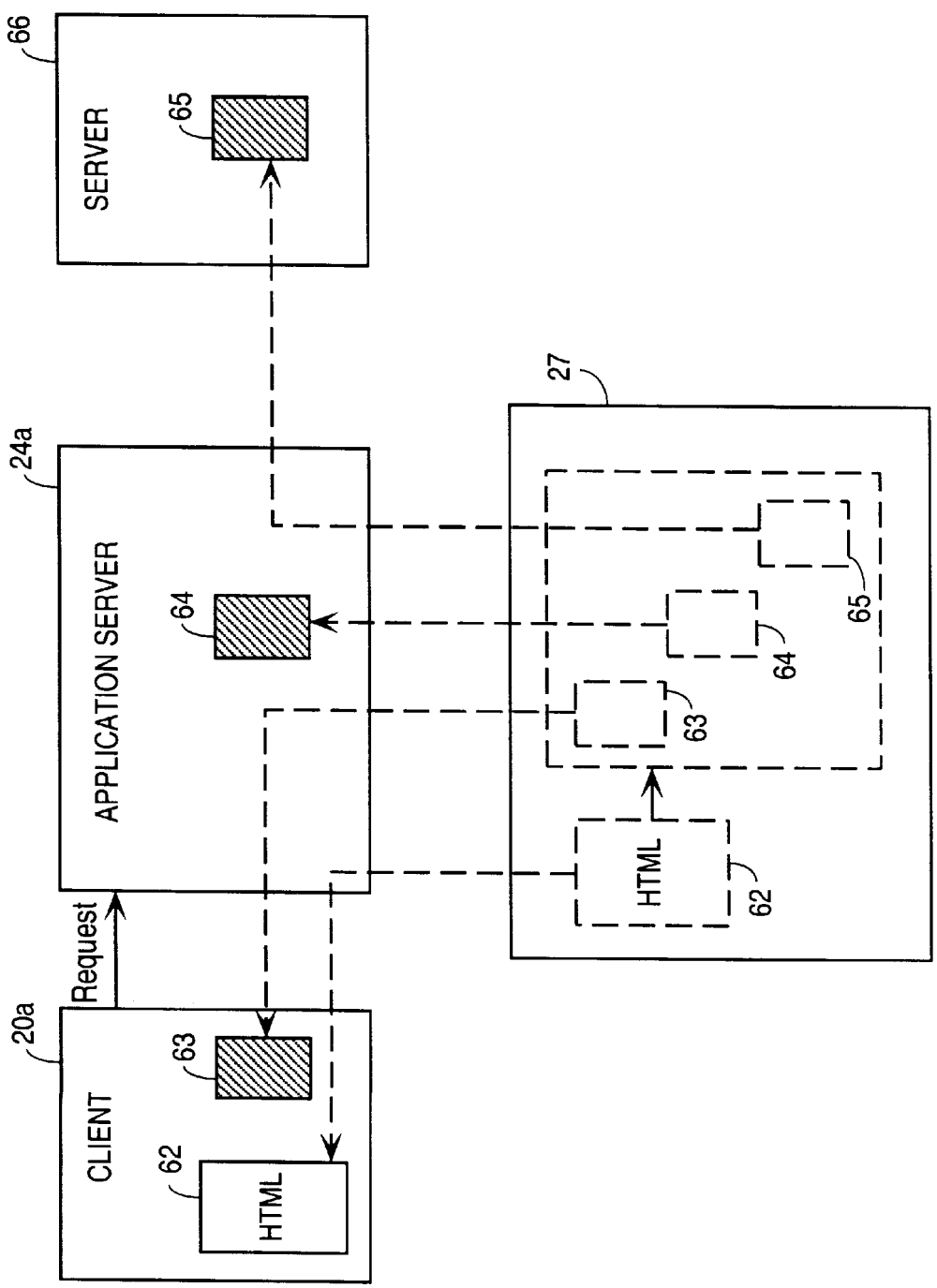
FIG. 8B is a diagram illustrating three executable components of an application being executed on three separate tiers.

Note that the present invention enables different components of an application, and even different components referenced by a single HTML page, to be instantiated and executed on different tiers. In addition, the present invention enables components of a single application to be concurrently instantiated and executed on three or more different tiers, e.g., a client tier and two or more server tiers. FIG. 8B illustrates a simple example of these capabilities. Another example is described below with reference to FIG. 10. In FIG. 8B, an HTML page 62 and three executable components 63, 64, and 65 referenced by the HTML page 62 are parts of an application of the present invention and are stored in storage facility 27. Of course, components 63, 64, and 65 are not instantiated as stored in storage facility 27.

The application server 24a receives a request for the HTML page 62 from the client 20a via the HTTP server 21a (see FIG. 3). In response to the request, the application server 24a provides the HTML page 62 to the client 20a. Also in response to this request, the application server 24a causes component 63 to be instantiated and executed on the client 20a, causes component 64 to be instantiated and executed on the application server 24a, and causes component 65 to be instantiated and executed on another server 66.

The tier assignments of components 63, 64 and 65 may be based on any or all of the above-mentioned tier assignment techniques, such as use of the tier attribute, load balancing, performance, etc. Thus, in this example, components 63b, 64b, and 65b are concurrently instantiated and executed on three separate tiers, the client 20a, the application server 24a, and the second server 66. Note, however, that components need not be executed on the application server 24a; that is, components could just as easily be executed on the client tier 20a and two or more server tiers other than the application server 24a.

Many application components may be considered to be data "producers", data "consumers", or "data controllers". A functional connection is often required between a particular data producer and a particular data consumer or between a data producer and a data controller, to allow data to be communicated between those components. As noted above, the director sub-component 34 (FIG. 7) maintains a list of registrations of all application components 26, which is used to automatically establish such connections. In accordance with the present invention, connections between executable components are established automatically and asynchronously, as required by the application 19, in response to requests from data producers or data consumers. Consequently, individual components effectively "snap together" automatically, without an application developer having to specify the connections.

Figure 9:
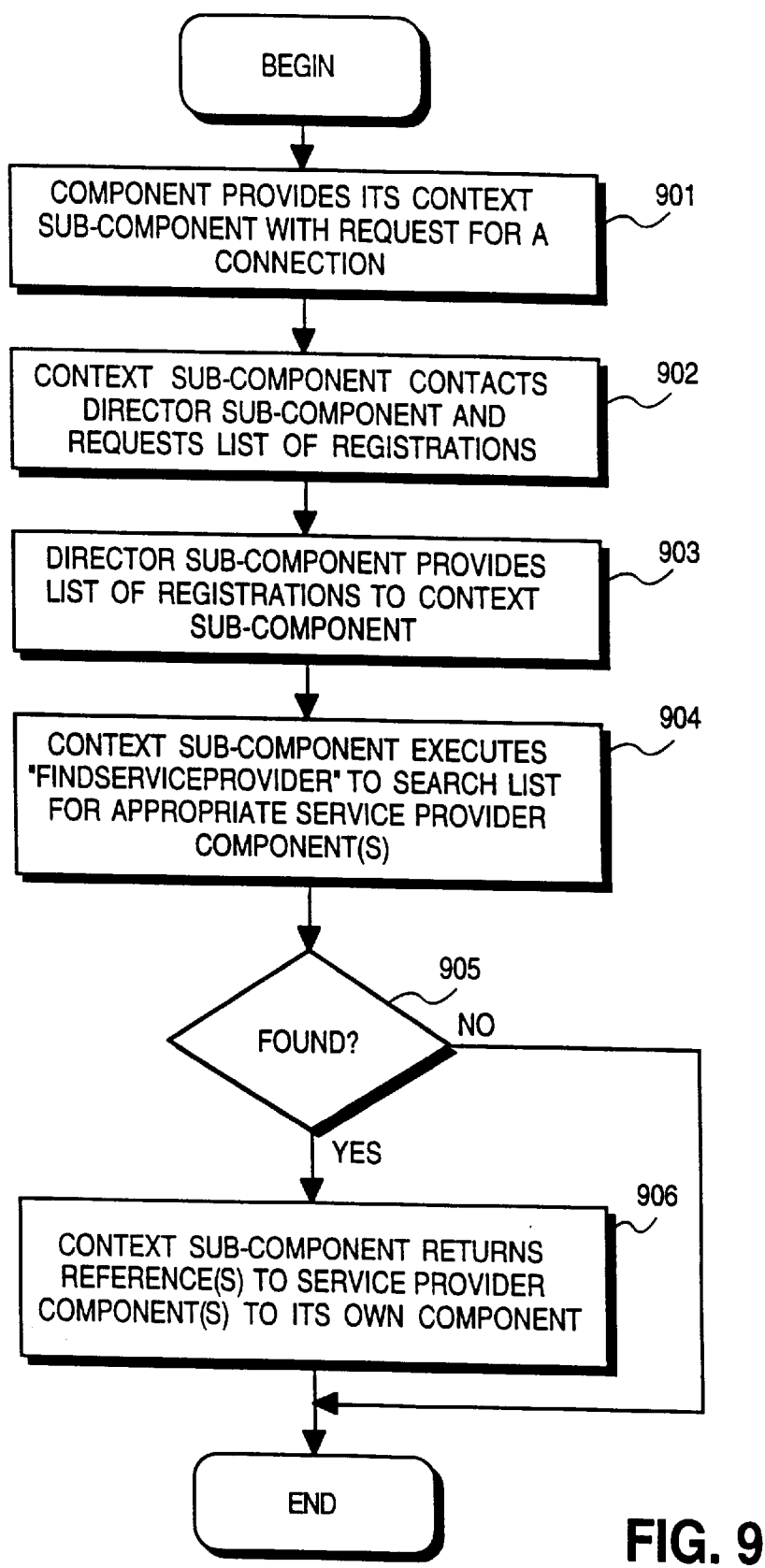
FIG. 9 is a flow diagram illustrating a routine by which an interface between two components is established.

Referring again to the example of FIG. 7, a connection 32 is required between the table component 30, which is a data producer, and the query component 31, which is a data controller. The function of establishing connections between components is generally performed by the infrastructure 28 and, more specifically, by the context sub-component of whichever component is requesting a connection. The process of establishing a connection between two components is described now in greater detail with reference to FIG. 9.

In step 901, a component, such as a data consumer, provides its context sub-component with a request. The request specifies a set of criteria to be used to identify one or more appropriate "service providers", or components to which the requesting component can be connected, such as a data producer. The criteria may include, for example, the name of one or more components to which a connection is needed or the name of one or more interfaces which the requesting component supports. In this context, an "interface" is a specification of the methods, or subroutines, which a component supports.

The request is actually provided to a method of the context sub-component Java class designated "findServiceProvider." (See the sample Java code below for an example of how the method findServiceProvider is used.) Thus, in step 902, the method findServiceProvider contacts the director sub-component 34 and requests the list of registered components maintained by the director sub-component 34. In step 903, the director sub-component 34 provides the list of registrations to the findServiceProvider of the requesting context sub-component. In step 904, findServiceProvider searches the list for the appropriate service provider or providers. Specifically, findServiceProvider uses the references in the list to identify any component or components which match the criteria specified in the request (e.g., which have the specified name or support the specified interface). Note that Java allows an object to be queried to determine whether the object supports a particular interface.

More than one of the other components may satisfy a request. Accordingly, the criteria specified in the request also include a flag, which the requesting component can set to indicate that it requires a reference to all components which satisfy its request. In addition, the criteria of the request may specifically limit the request to service providers (components) on the same tier as the requesting component (the local tier) or to service providers on a remote tier. Furthermore, remote requests can be limited to a set of scopes, etc.

Thus, if findServiceProvider finds a component or multiple components which satisfy the criteria in the request (step 905), then in step 906 findServiceProvider provides to the requesting component the reference or references to the one or more components which satisfy the request. If no component is found which satisfies the request, then the routine ends, with the request remaining pending until a component which satisfies the request becomes instantiated and registered on the current tier. Thus, connections between the components 26 of the present invention are established automatically and asynchronously as required by the application 19. "Asynchronously" means, in this context, that the requesting entity is able to perform other processing functions while the request is pending, rather than having to wait for a response to the request. Consequently, there is no specific temporal relationship between the issuance of a request for a connection and the response to that request; a request can be satisfied at any time after it has been submitted. Further, a connection can be automatically established even if the component which satisfies the request is not yet instantiated at the time the request is submitted.

In addition, a component may become "unregistered" for various reasons. Unregistration of a component may occur, for example, when the component becomes no longer instantiated, such as if the component is explicitly destroyed. If a component becomes unregistered for any reason, then the director sub-component 29a provides any components which have a connection to the unregistered component with a notice of unregistration, which indicates to such components that the unregistered component is no longer available.

Below is an example of the Java code for a HTML page that incorporates two application components, designated Blox1 and Blox2, as well as the Java code for these components. The component Blox1 supports an interface, ITest, which contains one method, getResponse. The method getResponse returns a string representation of the text in the text box displayed in this component. The function of these two components is to enable a user to change the text in the text box, such that another component can retrieve the text using the ITest interface. The component Blox2 has a user interface which shows certain status information in a text box and supports a button which, when pushed, will invoke the getResponse method of the ITest interface on Blox1. Blox2 locates this interface using the method IBloxContext.findServiceProvider. The call to this method may be in the bloxStart method of the component, which is discussed below. When the button is pushed, the string value, which originated in the text box of Blox1, is displayed in the text box of Blox2.

Thus, the sample HTML page is as follows:

```
<html>
<head>
<title>Example application</title>
</head>
<body>
<h1>Example application</h1>
<p>
Here are three Components: (Director, Blox1, and Blox2)
<br><br>
Director and Blox2 will be colored magenta because the Application.BGCOLOR property set on Director will be used as the default BGCOLOR property for all components that don't have their own BGCOLOR property. Note that Blox2 doesn't define any BGCOLOR, and gets its default value from Director.
<br>
<br>
Blox1 will be colored cyan since it overrides the default BGCoLoR property.
<br>
<br>
When this page finishes loading, "found ITest interface" will be displayed in the text field in Blox2. This means that the findServiceProvider call in Blox2 located the ITest interface defined in Blox1.
<br>
<br>
If one enters text in the text box in Blox1 and then push the button in Blox2, then the text that you entered in Blox1 will be displayed in Blox 2.
<br>
<br>
Note that no explicit wiring up between Blox1 and Blox2 occurs in the HTML file.
<br>
<br>
<applet code=alphablox.blox.applet.Director
   codebase="/classes"
   name=Director
   height=20
   width=20>
<param name=Application.BGCOLOR value=magenta>
</applet>
<applet code=Blox1
   codebase="/classes"
   name=Blox1
   height=200
   width=200>
<param name=BGCOLOR value=cyan>
</applet>
<applet code=Blox2
   codebase="/classes"
   name=Blox2
```

```
    height=200
    width=200>
</applet>
</body>
</html>
```

The following is sample Java code for the component Blox1.

```java
import alphablox.mortar.*;
import alphablox.awt.*;
import java.awt.*;
public class Blox1 extends BloxApplet implements ITest
{
    TextField textField=new TextField("default value"); // a text box where one can edit the response
    public void bloxInit( )
    {
    super.bloxInit( ); // make sure BloxApplet-bloxInit gets an opportunity to run
        setLayout(new BorderLayout( );
        add("Center", textField);
    }
        // bloxStart was not overridden, but the base class BloxApplet defined a bloxStart that caused this component to become registered with the infrastructure.
        // implementation of ITest interface
/**
* Return the contents of the text field
*/
public String getResponse( )
{
    return textField.getText( );
{
{
```

The following is the sample Java code for Blox2. The sample code illustrates the use of methods bloxStart and findServiceProvider.

```java
import alphablox.mortar.*;
import alphablox.awt.*;
import java.awt.*;
public class Blox2 extends BloxApplet implements IServiceFoundListener
{
    TextField textField=new TextField(20); // a text box where one can write text
    Button pushMe=new Button("PushMe"); // a button which one can push to cause an action to occur
    private ITest test; // where the ITest interface will be put when it is received from Blox1
    public void bloxInit( )
    }
        super.bloxInit( ); // make sure BloxApplet.bloxInit gets an opportunity to run
        setLayout(new BorderLayout( );
        add("Center", textField);
        add("South", pushMe);
        pushMe.disable( ); // disable this button until service provider is found
    {
public void bloxStart( )
{
    super.bloxstart( ); // make sure BloxApplet.bloxStart gets an opportunity to run
    getBloxContext( ).findServiceProvider("ITest", this); // start search for any component that supports the ITest interface
{
    /**
    * This method is invoked by infrastructure when a service requested by findServiceProvider is satisfied
    */
    public void serviceProviderFound(ServiceEvent event)
    {
        textField.setText("got a response from findServiceProvider");
        Object serviceProvider=event.getServiceProvider( ); if (serviceProvider instanceof ITest) // it was indeed an ITest supporting object
        {
            test=(ITest)serviceProvider; // therefore, remember this interface . . .
            textField.setText("found ITest interface");
            pushMe.enable( ); // and enable the button so it can be called
        {
    {
    /**
    * This method is invoked by the infrastructure when a service provider is no longer available.
    * We ignore this event.
    */
    public void serviceProviderUnregistered(ServiceEvent event)
    {
    /**
    * This method is called by AWT (windowing library) when, for example, a button is pushed.
    */
        public boolean action(Event event, object arg)
    {
        boolean handled=false;
        if (event.target==pushMe) // when the pushMe button is pressed
        {
        String response=test.getResponse( ); // ask Blox1 for a "response"
        textField.setText("got\""+response +"\" from Blox1"); // display what was
    returned
        handled=true; // tell AWT that event was handled
        }
        return handled;
        }
}
```

The following is sample Java code for the ITest interface:

```java
public interface ITest
{
    String getResponse( );
}
```

As is well known, Java applets support four standard methods (among others): init, start, stop, and destroy. In the present invention, these methods are called by the client 20a or the application server 24a to manage the lifetime of an applet (e.g., one of the components 26). Generally, calling the init method causes an applet to be initialized; calling start causes an applet to be started; calling stop causes an applet to be stopped; and calling destroy causes an applet to be destroyed. In the present invention, these four methods call four additional methods, referred to as bloxInit, bloxStart, bloxStop, and bloxDestroy. For a given component (e.g., Blox1 or Blox2 in the example below), the default (base) implementation of bloxInit causes the component's context sub-component to be created. The default implementation of bloxStart causes the component to be registered with the director sub-component. In addition, if there are any requests for connections pending from other components, the act of registration causes a determination of whether the newly registered component matches the criteria of any of the requests and, if so, a message to be sent to the service requestor that the component is registered. The default implementation of bloxDestroy method causes a component to be unregistered and a message of unregistration sent to any component which has a connection to that component.

In the example above, Director is the embodiment of the director component 29. Director serves only as a place to define certain global defaults, as noted above. An example of such a default is the definition of Application.BGCOLOR property on Director, which is used by all components of the application as the "background color" unless explicitly overridden on individual components.

Blox1 and Blox2 are both derived from the base class BloxApplet. This class is defined in the infrastructure 28 (see FIGS. 3, 4A, and 4B). The class BloxApplet defines the default implementation of bloxInit, bloxStart, bloxStop, and bloxDestroy, described previously. BloxApplet creates the BloxContext, which in turn exposes the IBloxContext interface. The getBloxContext method in BloxApplet returns the IBloxContext interface.

Blox1 and Blox2 override the default bloxInit implementation, while delegating to it to get the base functionality. In the overridden method, each blox does its specific initialization. Blox1 does not override bloxStart, bloxStop, and bloxDestroy, and therefore simply gets the default implementation from BloxApplet. Blox2 overrides the default bloxStart implementation, while delegating to it to get the base functionality. In the overridden method, Blox2 attempts to locate an object which supports the ITest interface. It does so by using the getBloxContext method in BloxApplet to get the IBloxContext interface, and then alls the findServiceProvider method on this interface.

There are two possibilities in this example: Either Blox1 will be instantiated first or it will be instantiated second. If Blox1 is instantiated first, then when its base implementation of bloxStart is called, it will be registered with the Director sub-component 34. When Blox2's bloxStart is called, the findServiceProvider call will result in the infrastructure's locating Blox1 and invoking Blox2's serviceProviderFound method, notifying Blox2 of the component which satisfies its request.

If Blox2 is instantiated first, the findServiceProvider call will not find any component to satisfy the request, and the request will remain pending. When Blox1 is instantiated, and when its base implementation of bloxStart is called, it will be registered with the Director sub-component 34. This action will result in the infrastructure's noticing the pending request and notifying Blox2 (via the serviceProviderFound method) of Blox1's existence.

Figure 10:
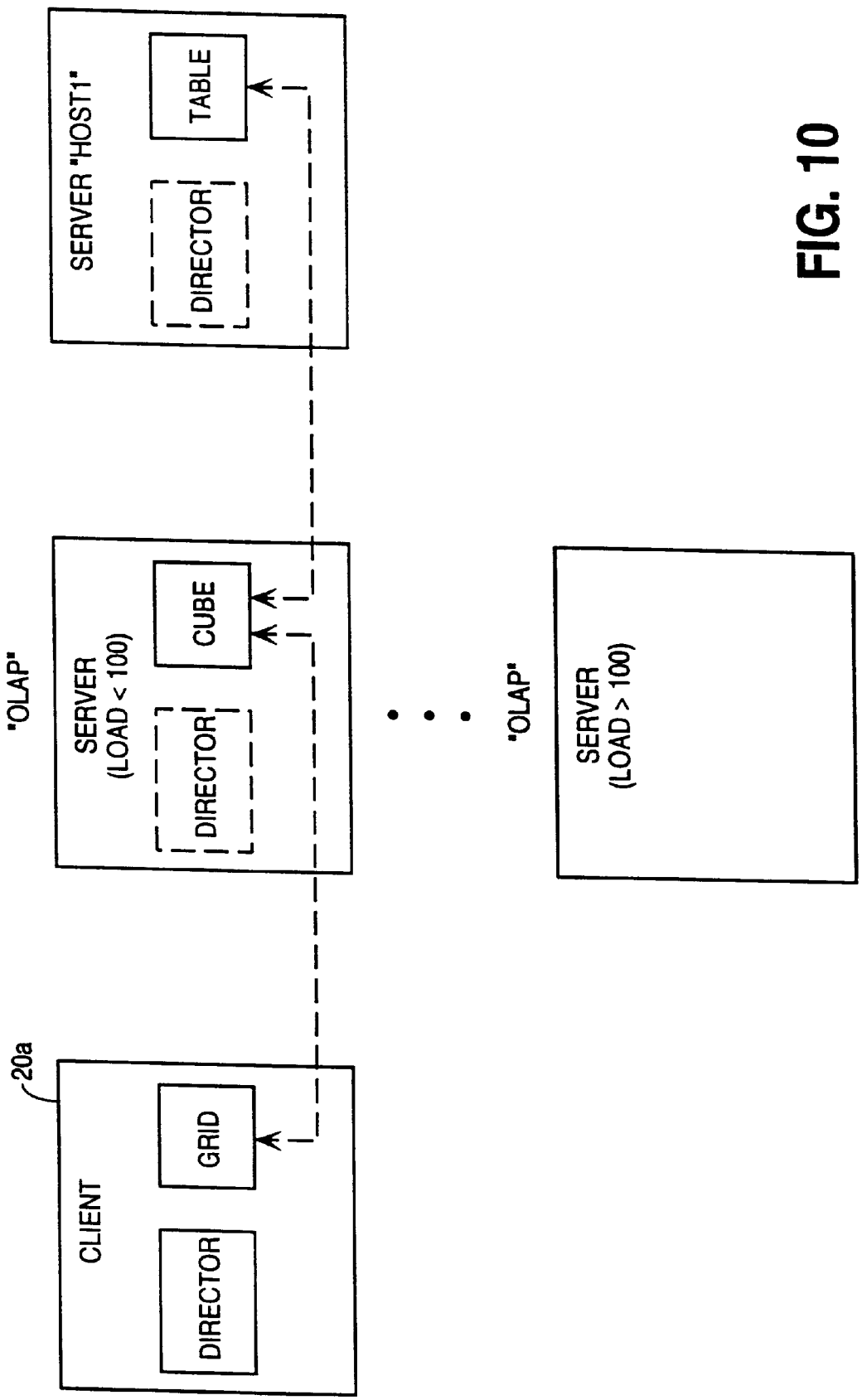
FIG. 10 is a diagram illustrating multiple executable components of an application being executed on multiple tiers.

As mentioned above, the present invention also provides the capability to distribute components of a single application across three or more separate tiers (e.g., a client tier and two or more server tiers) and to automatically establish connections between the appropriate components. An example of this capability was described above with reference to FIG. 8B. The following is sample Java code for another example in which components are executed on three separate tiers, which is also illustrated in FIG. 10.

```
<html>
<head>
<title>N-tier Example</title>
<body>
<h1>N-tier Example</h1>
<body>
<applet code=alphablox.blox.applet.Director
    name=Director
    codebase=/classes
    tier=client
<param name=ApplicationName value=MyApp>
</applet
<applet code=alphablox.blox.applet.Table
    name=Table
    codebase=/classes
    tier="server:host=Host1"
    scope=application
<param name=ApplicationName value=MyApp>
</applet>
<applet code=alphablox.blox.applet.Cube
    name=Cube
    codebase=/classes
    tier="server:load<100class=olap"
    scope=application
<param name=ApplicationName value=MyApp>
</applet>
<applet code=alphablox.blox.applet.Grid
    name=Grid
    codebase=/classes
    tier=client
<param name=ApplicationName value=MyApp>
</applet>
</body>
</html>
```

In the above "n-tier" example, there are four blox involved: Director, Table, Cube, and Grid, as shown in FIG. 10. Director and Grid are specified to be run on the client tier. Table and Cube are specified to run on server tiers. Note that while Director is explicitly authored to execute on the client tier, in accordance with the present invention, additional Director components are also automatically instantiated and executed on each additional tier on which another component is to execute. Table is explicitly specified to run on a server named "Host1". Cube is specified to run on any server tier which match specific criteria. These criteria are configurable by system administrators and are specified here only for purposes of illustration. In this example, Cube will be run on any available server whose "load" factor is less than 100 and which belongs to a class of servers that have been labeled as "olap". Both of the server components are specified as being of "application" scope, which means that these components will be available to any other components in the same application. The application used for all components in this example is named, "MyApp".

In operation, the application server 24a (not shown in FIG. 10—see FIG. 3) will strip out the two server-scope components from the HTML sent to the client 20a. Thus, the client 20a will only instantiate the Director and Grid components. Prior to serving the page to the client 20a, however, the application server 24a will locate the appropriate servers which match the specified tier criteria and cause these components to be executed on those tiers. It will also keep track of all the servers involved in serving this request so that it can know which servers to contact to satisfy findServiceProvider requests.

The Table component, once instantiated on its tier, will locate its external data source (due to the role that Table plays, it doesn't attempt to locate another component, but uses external protocols to determine its data source). The Cube component, however, cannot function until it locates a Table datasource (more accurately, a component which supports the ITableProducer interface, which Table does). Cube attempts to locate the ITableProducer component on its own tier, and doesn't find it. It then contacts the application server 24*a* to find the correct component. Because the application server 24*a* knows that it instantiated components on Host1 and the requesting tier, it passes the request to Host1 (assuming that the requesting tier has already been searched). Host1's Director gets the request and locates the Table component, returning this result to the application server 24*a*. The application server 24*a* then returns this result to Cube. A connection between Cube and Table is thus established.

On the client tier, Grid looks for its data source (of type ICubeProducer). Not finding the data source on its tier (client 20*a*), it passes the request to the application server 24*a*. The application server 24*a* passes the request to both Host1 and the host on which it started the Cube component. The Cube component (which supports the ICubeProducer interface) is thus located, and a reference to it returned to the Grid component on the client 20*a*.

Implicitly, remote proxies and stubs are created to allow the appearance of a local interface when, in fact, the interface spans separate tiers.

Figure 11:
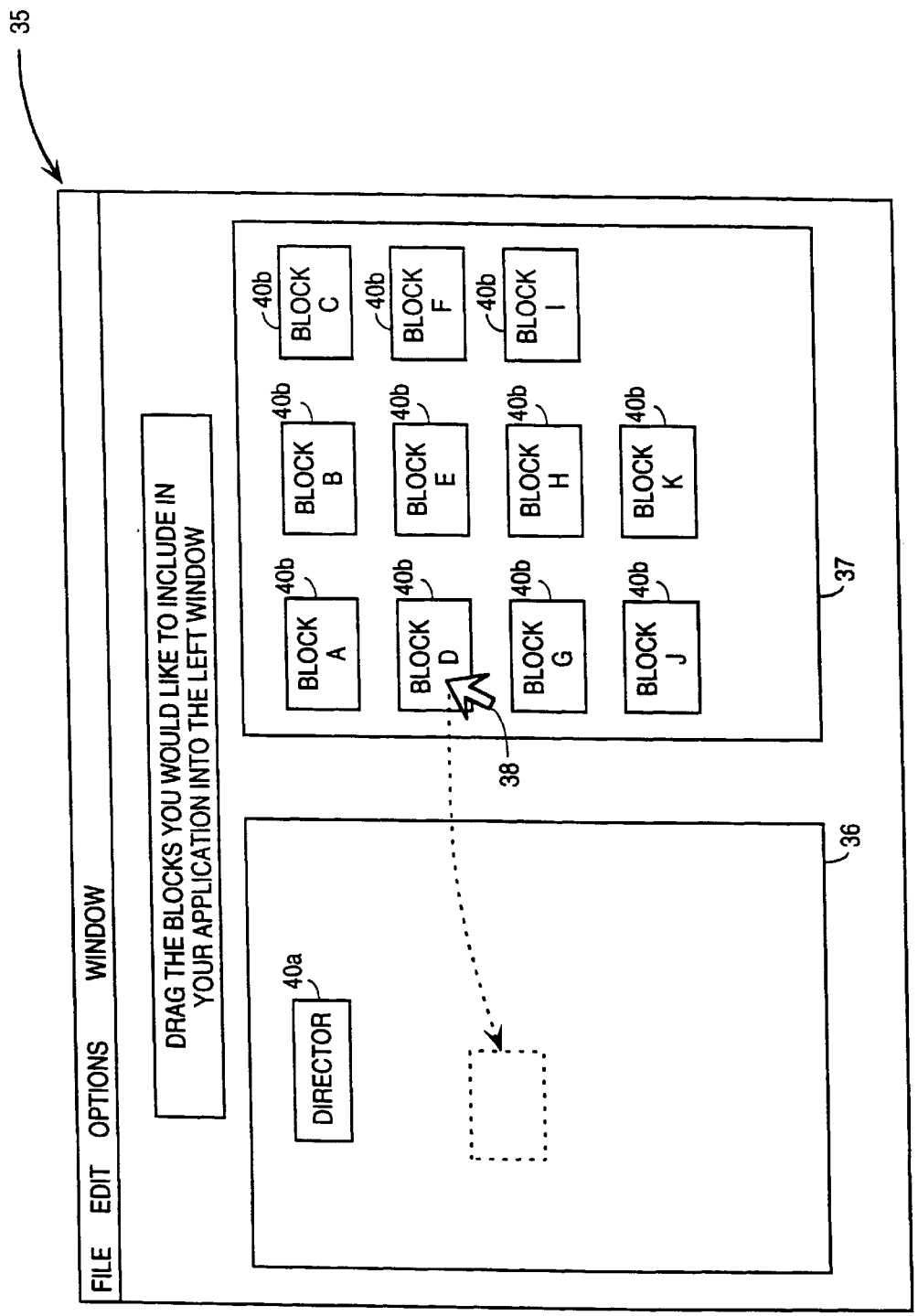
FIG. 11 illustrates a display screen showing a graphical user interface for assembling a software application.

The present invention also includes a mechanism for generating applications of the type described above, based on templates. Using this mechanism, any conventional Web page design environment or Internet integrated development environment (IDE) (e.g., Microsoft FrontPage, Netscape Visual JavaScript, or Net Objects Fusion) can be used to create applications according to the present invention. Specifically, a conventional storage facility can be used to store a library of components that can be included by application designers in various different Web applications. Thus, an application designer can select particular components to create custom-designed applications. This process may be performed via a graphical user interface such as illustrated in FIG. 11. FIG. 11 shows a display 35 including two windows 36 and 37. A number of icons 40*b* are displayed in window 37, each of which represents a component according to the present invention. The application developer uses a pointing device to place a cursor 38 on particular ones of icons 40*b* and to drag-and-drop them into window 36 to incorporate the corresponding components (i.e., Java classes) into the application. The interface of FIG. 11 may be such that icon 40*a* representing the director component 29 appears in window 36 by default, since each application includes at least one director component.

In response to the application developer's dragging and dropping an icon into window 36, a corresponding applet tag is automatically inserted into the HTML page being authored. In one embodiment, window 36 can also be used to input text using a conventional HTML editor, such that the application developer can graphically combine standard HTML with various components. In response to icons 40*b* being dropped within window 36, the corresponding components are effectively included within the application that is being created. Consequently, at run time the infrastructure 28 will automatically ensure that the correct connections between the components are automatically established. The application developer is not required to specify these connections.

Figure 12:
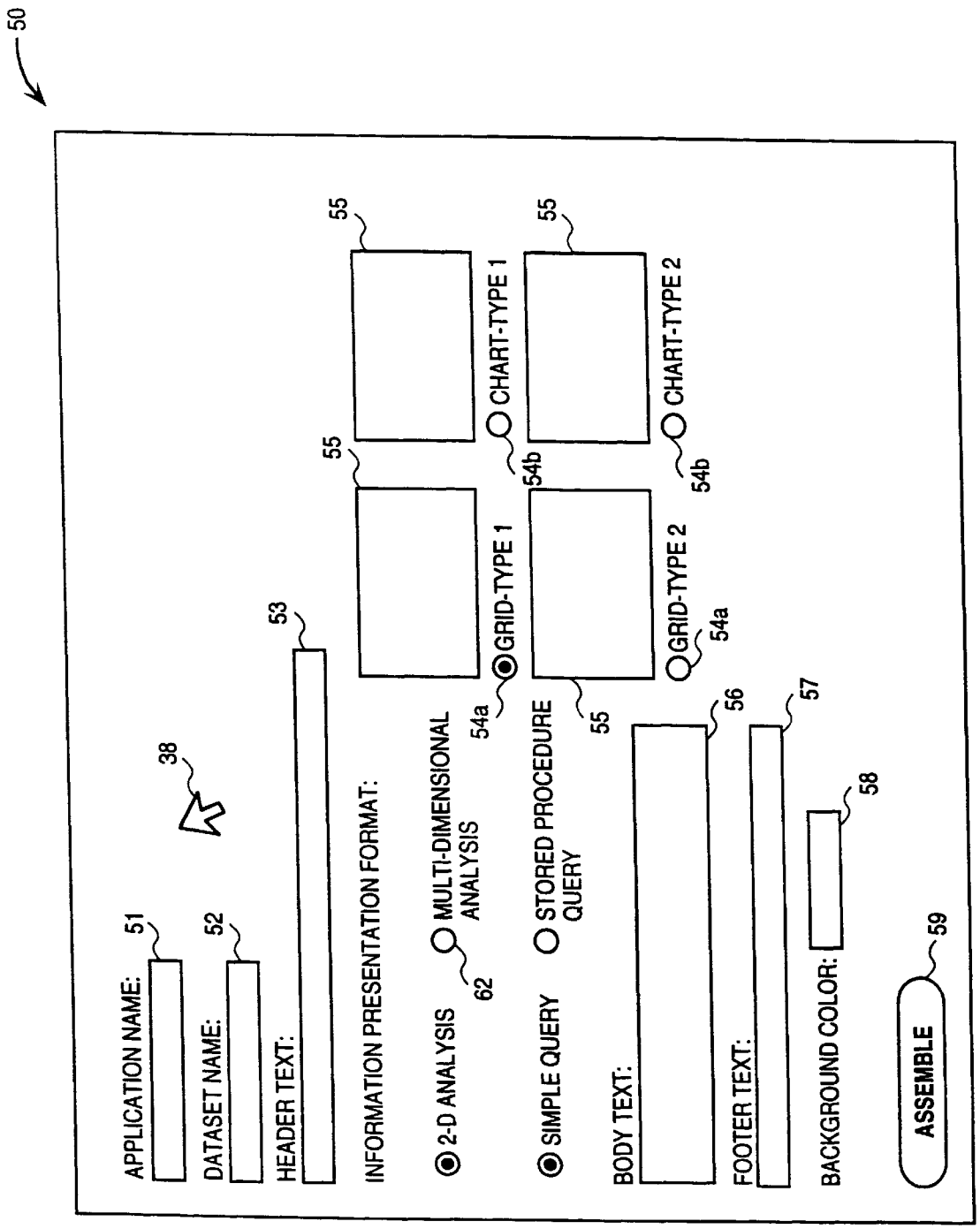
FIG. 12 illustrates a display screen showing a graphical user interface, using which an end user can assemble and execute a customized application.

FIG. 12 illustrates another graphical user interface by which an end user can both assemble and execute a customized application. In this example, the application to be assembled is a database application. The display screen 50 is an HTML page, and the application includes one or more executable components according to the present invention. From the display screen 50, the end user can effectively select which components are included in the application and thereby generate a customized output report of data stored in the database. The display 50 also includes a set of options from which the user can select to generate a customized output report. The options include the particular format of the report to be generated. The user's selections from among these options determine which executable components are included in the application for the current run of the application.

In this example, the executable components which may be included in the application (which are not shown) include a grid component for generating a report in grid format, a chart component for generating a report in chart format, and a cube component for maintaining a multi-dimensional data set. Each of rectangles 55 represents an image depicting a reduced-size example of the corresponding format. Accordingly, the user can select one of buttons 54A to request a specific grid format; alternatively, the user can select one of buttons 54B to request a specific chart format. In this example, there are two different grid formats and two different chart formats from which the user may choose. When the user subsequently clicks on the "Assemble" button 59, the user's format selections cause the appropriate component or components (i.e., grid component or chart component) to be automatically identified and executed. The user's selection of button 62 for "Multi-Dimensional Analysis" will result in the cube component being automatically included in the application and executed when "Assemble" button 59 is clicked on. Further, by employing the above-described techniques for automatically establishing connections between components, the appropriate connections are automatically established between the selected components in response to the "Assemble" button 59 being clicked on. The end user does not need to wire any of the connections.

The end user can also customize various attributes of the application components using screen 50. For example, the user can: enter the name of the application to be assembled in field 51 or choose from a list of previously assembled applications; specify a predefined data set in field 52 rather than specifying a new query; specify text to be included in the header, body, and footer of the report by entering the text in fields, 53, 56, and 57, respectively; and, specify a background color for the report in field 58.

Thus, using a graphical user interface such as that shown in FIG. 12 in conjunction with other features of the present invention, the user can assemble and execute a customized application by selecting only the desired components for inclusion in the application. Connections between the selected components are automatically established when the application is executed, such that the end user does not need to be concerned with "wiring" components together.

Thus, a mechanism for automatically establishing connections between executable components of a hypertext-based application has been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method of automatically establishing a connection between executable components of a software application, the software application including a plurality of executable components, the method comprising the steps of:

issuing a request from a first component of the plurality of executable components, the request specifying a set of criteria;

identifying a second component of the plurality of executable components which satisfies the set of criteria; and providing to the first component, asynchronously with the request, information identifying the second component.

2. A method according to claim 1, wherein if the second component is instantiated subsequent to the issuing of the request, the step of providing information identifying the second component to the first component comprises the steps of:

waiting for the second component to be instantiated; and in response to instantiation of the second component, providing the information identifying the second component to the first component.

3. A method according to claim 1, further comprising the steps of:

unregistering the second component, including removing the second component from a set of registrations; and in response to unregistering the second component, providing a notice of unregistration to the first component.

4. A method according to claim 1, wherein if more than one of the components satisfies the set of criteria, the method further comprises the step of providing to the first component information identifying each of the plurality of components which satisfies the set of criteria.

5. A method according to claim 1, wherein the software application comprises a set of hypertext-based pages, and wherein each of the components is referenced by at least one of the set of hypertext-based pages.

6. A method according to claim 1, further comprising the steps of:

maintaining a registration of each of the plurality of components in a set of registrations;

wherein the step of identifying the second component comprises the step of using the set of registrations to identify the second component based on the set of criteria.

7. A method according to claim 6, further comprising the step of creating a director object in response to the software application being invoked, the director object for maintaining the set of registrations.

8. A method of enabling a target computer to establish a connection between components of an application, the application including a plurality of executable components, the method comprising the step of transmnitting sequences of instructions from a host computer to the target computer, the sequences of instructions including instructions which, when executed on the target computer, cause the target computer to perform the method recited in claim 1.

9. An apparatus for establishing a connection between executable components of a software application, the software application including a set of hypertext-based pages and a plurality of executable components, wherein each of the executable components is referenced by at least one of the set of hypertext-based pages, the apparatus comprising:

means for issuing a request from a first executable component of the plurality of executable components, the request specifying a set of criteria;

means for identifg a second executable component of the plurality of executable components which satisfies the set of criteria; and means for providing, asynchronously with the request, information identifying the second executable component to the first executable component.

10. An apparatus according to claim 9, wherein the set of criteria comprises a name of one of the plurality of executable components.

11. An apparatus according to claim 9, wherein the set of criteria comprises a name of an interface.

12. An apparatus according to claim 9, further comprising:

means for waiting for the second component to be instantiated if the second component is instantiated subsequent to the issuing of the request; and means for providing the information identifying the second component to the first component in response to instantiation of the second component.

13. An apparatus according to claim 9, further comprising:

means for unregistering the second component, including removing the second component from the set of registrations; and means for providing a notice of unregistration to the first component in response to unregistering the second component.

14. An apparatus according to claim 9, further comprising means for providing to the first component information identifying a plurality of the components which satisfy the set of criteria when more than one of the components satisfies the set of criteria.

15. An apparatus according to claim 9, further comprising:

means for maintaining a registration of each of the plurality of components in a set of registrations; and means for using the set of registrations to identify the second component based on the set of criteria.

16. An apparatus according to claim 15, further comprising means for instantiating and maintaining director object, the director object for maintaining the set of registrations.

17. A method of automatically establishing a connection between executable components of a software application, the software application including a plurality of executable components, the method comprising the steps of:

issuing a request from a first component of the plurality of executable components, the request specifying a set of criteria;

identifying a subset of the plurality of executable components, the subset including more than one of the plurality of executable components satisfying the set of criteria; and providing to the first component information identifying each of the components of the subset.

18. A method according to claim 17, wherein the step of providing to the first component information identifying each of the components of the subset comprises the step of providing information identifying at least one of the components to the first component asynchronously with the request.

19. A method according to claim 17, further comprising the steps of:

unregistering a second component of the plurality of components, the second component included within said subset, including removing the second component from the set of registrations; and in response to unregistering the second component, providing a notice of unregistration to the first component.

20. A method according to claim 17, wherein the software application comprises a set of hypertext-based pages, and wherein each of the components is referenced by at least one of the set of hypertext-based pages.

21. A method according to claim 17, further comprising the steps of:
   maintaining a registration of each of the plurality of components in a set of registrations;
   wherein the identifying step comprises the step of using the set of registrations to identify said subset.

22. A method according to claim 21, further comprising the step of creating a director object in response to the software application being invoked, the director object for maintaining the set of registrations.

23. A method of enabling a target computer to establish a connection between executable components of a software application, the software application including a plurality of executable components, each of the components for performing a function during execution of the software application, the method comprising the step of transmitting sequences of instructions from a host computer to the target computer, the sequences of instructions including instructions which, when executed on the target computer, cause the target computer to perform the method recited in claim 17.

24. An apparatus for automatically establishing a connection between executable components of a software application, the software application including a set of hypertext-based pages and a plurality of executable components, wherein each of the executable components is referenced by at least one of the set of hypertext-based pages, the apparatus comprising:
   means for issuing a request from a first executable component of the plurality of executable components, the request specifying a set of criteria;
   means for identifying a subset of the plurality of executable components, the subset including more than one of the plurality of executable components satisfying the set of criteria; and
   means for providing to the first executable component information identifying each of the executable components of the subset.

25. An apparatus according to claim 24, wherein the set of criteria comprises a name of one of the plurality of executable components.

26. An apparatus according to claim 24, wherein the set of criteria comprises a name of an interface.

27. An apparatus according to claim 24, wherein the means for providing to the first component information identifying each of the components of the subset comprises means for providing information identifying at least one of the components to the first component asynchronously with the request.

28. An apparatus according to claim 24, further comprising:
   means for unregistering a second component of the plurality of components, the second component included within said subset, including removing the second component from the set of registrations; and
   means for providing a notice of unregistration to the first component in response to unregistering the second component.

29. An apparatus according to claim 24, further comprising:
   means for maintaining a registration of each of the plurality of components in a set of registrations; and
   means for using the set of registrations to identify said subset.

30. A apparatus according to claim 28, further comprising means for creating a director object, the director object for maintaining the set of registrations.

31. A mechanism for enabling a software application to be created, the mechanism comprising:
   means for enabling an application developer to include a plurality of executable components in the software application without any person having to specify connections between any of the components in code, wherein at least two of the plurality of components require a connection to each other during execution of the software application; and
   means for enabling the connections required by the components to be established automatically during execution of the software application without using any program code based connections between the components.

32. A mechanism according to claim 31, wherein the software application includes a set of hypertext-based pages, the mechanism further comprising means for enabling the developer to assign the components to particular pages of the set of hypertext-based pages.

33. A mechanism according to claim 31, wherein the means for enabling the connections required by the components to be established automatically during execution of the software application comprises means for enabling the connections to be established automatically in response to a signal for initiating execution of the software application.

34. A machine-readable program storage device tangibly embodying sequences of instructions, the sequences of instructions executable by a processing system to perform steps for enabling a user to assemble a software application, the steps comprising:
   enabling the user to include a plurality of executable components in the software application without any person specifying connections between any of the components in code, wherein at least two of the plurality of components require a connection to each other during execution of the software application, such that the connections required by the components are established automatically during execution of the software application without using any code based connections.

35. A storage device according to claim 34, wherein the software application includes a set of hypertext-based pages, said steps further comprising enabling the user to assign the components to particular pages of the set of hypertext-based pages.

36. A method of assembling a software application, the method comprising the steps of:
   displaying a set of identifiers on a display device of a processing system, each identifier corresponding to one of a plurality of executable components of the software application;
   receiving first user input specifying at least one selection from the set of identifiers;
   receiving second user input and, in response to the second user input:
      identifying a subset of the plurality of executable components to be included in the application based on the first user input, the subset including at least one pair of executable components requiring a connection to each other for execution of the application, wherein the application includes no specification of the connection; and automatically establishing the connection.

37. A method according to claim 36, further comprising the step of causing each of the executable components of the subset to be executed in response to the second user input.

38. A method according to claim 36, wherein the step of establishing the connection comprises:

issuing a request from a first executable component, the request specifying a set of criteria;

identifying a second executable component which satisfies the set of criteria; and providing, asynchronously with the request, information identifying the second executable component to the first executable component.

39. A method according to claim 36, wherein the step of establishing the connection comprises:

issuing a request from a first executable component, the request specifying a set of criteria;

identifying which of the plurality of executable components satisfy the set of criteria; and providing to the first executable component information identifying the executable components which satisfy the set of criteria, wherein the executable components which satisfy the set of criteria may include a plurality of executable components.

40. A method of executing a software application, the method comprising the steps of:

displaying a graphical user interface on a display device, the graphical user interface including a set of options;

receiving first user input specifying at least one selection from the set of options;

receiving second user input for executing the software application; and in response to the second user input:

identifying a plurality of executable components to be included in the software application based on the first user input, wherein at least two of the plurality of executable components require a connection to each other for executing the software application;

assembling the application by establishing any connections required by the plurality of executable components without using a specification of connections between any of the plurality of executable components; and causing the plurality of executable components to be executed.

41. A method according to claim 40, wherein the step of establishing any connections required by the plurality of executable components comprises:

issuing a request from a first executable component of the plurality of executable components, the request specifying a set of criteria;

identifying a second executable component of the plurality of executable components which satisfies the set of criteria; and providing, asynchronously with the request, information identifying the second executable component to the first executable component.

42. A method according to claim 40, wherein the step of establishing any connections required by the plurality of executable components comprises:

issuing a request from a first executable component of the plurality of executable components, the request specifying a set of criteria;

identifying a subset of the plurality of executable components which satisfy the set of criteria; and providing to the first executable component information identifying each of the executable components of the subset, the subset including a plurality of executable components.

43. A computer system comprising:

a processor; and a storage facility coupled to the processor, the storage facility having stored therein an application and an infrastructure, the application including a plurality of executable components and a set of hypermedia-based pages referencing the executable components, the plurality of executable components including a first executable component, such that when the application is executed, the first executable component initiates a request for a connection to at least one other of the plurality of executable components by issuing a request specifying a set of criteria for the connection, the infrastructure maintains registrations of the plurality of executable components, the infrastructure identifies at least one of the plurality of executable components which satisfies the set of criteria based on the registrations, and the infrastructure provides to the first executable component, asynchronously with the request, information identifying each of the executable components which satisfy the criteria.

44. A computer system according to claim 43, wherein if none of the plurality of executable components satisfies the set of criteria, the infrastructure waits for instantiation of a second executable component which satisfies the set of criteria and, in response to said instantiation, provides information identifying the second component to the first component.

45. A computer system according to claim 43, wherein the set of criteria comprises a name of one of the plurality of executable components.

46. A computer system according to claim 43, wherein the set of criteria comprises a name of an interface.

* * * * *

UNITED STATES PATENT AND TRADEMARK OFFICE
CERTIFICATE OF CORRECTION

PATENT NO. : 6,272,673 B1
DATED : August 7, 2001
INVENTOR(S) : Dale et al.

It is certified that error appears in the above-identified patent and that said Letters Patent is hereby corrected as shown below:

<u>Title page,</u>
Item [75], Inventors, add Kevin W. Lawrence, San Jose, CA.

Signed and Sealed this

Fifteenth Day of January, 2002

Attest:

JAMES E. ROGAN
*Director of the United States Patent and Trademark Office*

*Attesting Officer*

UNITED STATES PATENT AND TRADEMARK OFFICE
CERTIFICATE OF CORRECTION

| | |
|---|---|
| PATENT NO. | : 6,272,673 B1 |
| APPLICATION NO. | : 08/978062 |
| DATED | : August 7, 2001 |
| INVENTOR(S) | : Geoffrey W. Dale et al. |

It is certified that error appears in the above-identified patent and that said Letters Patent is hereby corrected as shown below:

In Column 22 line 1, please change "identifg" to "identifying".

Signed and Sealed this

Twenty-ninth Day of May, 2012

David J. Kappos
*Director of the United States Patent and Trademark Office*